United States Patent [19]

Kime

[11] Patent Number: 4,651,678

[45] Date of Patent: Mar. 24, 1987

[54] MULTI-CHANNEL RADIO-CONTROLLED ROBOTIC JOCKEY/MONITOR

[76] Inventor: David R. Kime, P.O. Box 105, Windsor, Mo. 65360

[21] Appl. No.: 792,858

[22] Filed: Oct. 30, 1985

[51] Int. Cl.$^4$ ............................................ A01K 15/00
[52] U.S. Cl. ......................................................... 119/29
[58] Field of Search ............... 119/29; 54/71; 358/105, 358/108

[56] References Cited

U.S. PATENT DOCUMENTS

| | | | |
|---|---|---|---|
| 710,267 | 9/1902 | Graf | 54/71 |
| 2,800,104 | 7/1957 | Cameron et al. | 119/29 |
| 2,996,043 | 8/1961 | Pettingill | 119/131 |
| 3,589,337 | 6/1971 | Doss | 119/29 |
| 3,733,530 | 5/1973 | Labart et al. | 318/16 |
| 4,081,830 | 3/1978 | Mick et al. | 358/105 |
| 4,190,968 | 3/1980 | Clapp et al. | 35/29 R |
| 4,199,921 | 4/1980 | Watkins | 54/71 |
| 4,304,193 | 12/1981 | Madden | 119/29 |

Primary Examiner—Hugh R. Chamblee
Attorney, Agent, or Firm—Oblon, Fisher, Spivak, McClelland & Maier

[57] ABSTRACT

Apparatus for controlling by radio the movement of one or more animals simultaneously by one or more operators. Robotic control is provided for manipulation of reins, and for means to contact the animal to simulate a crop, spurs and the knees of a rider. Joy stick control is provided for the reins, while the other functions are governed using pushbuttons. High torque rotary output servomechanisms, coupled with the physical design of the various elements, provides for good simulation of a human rider. Video and two-way audio communications are provided. In its various embodiments, the apparatus is useful for training animals, for remotely controlling animals, and for securing an area.

13 Claims, 25 Drawing Figures

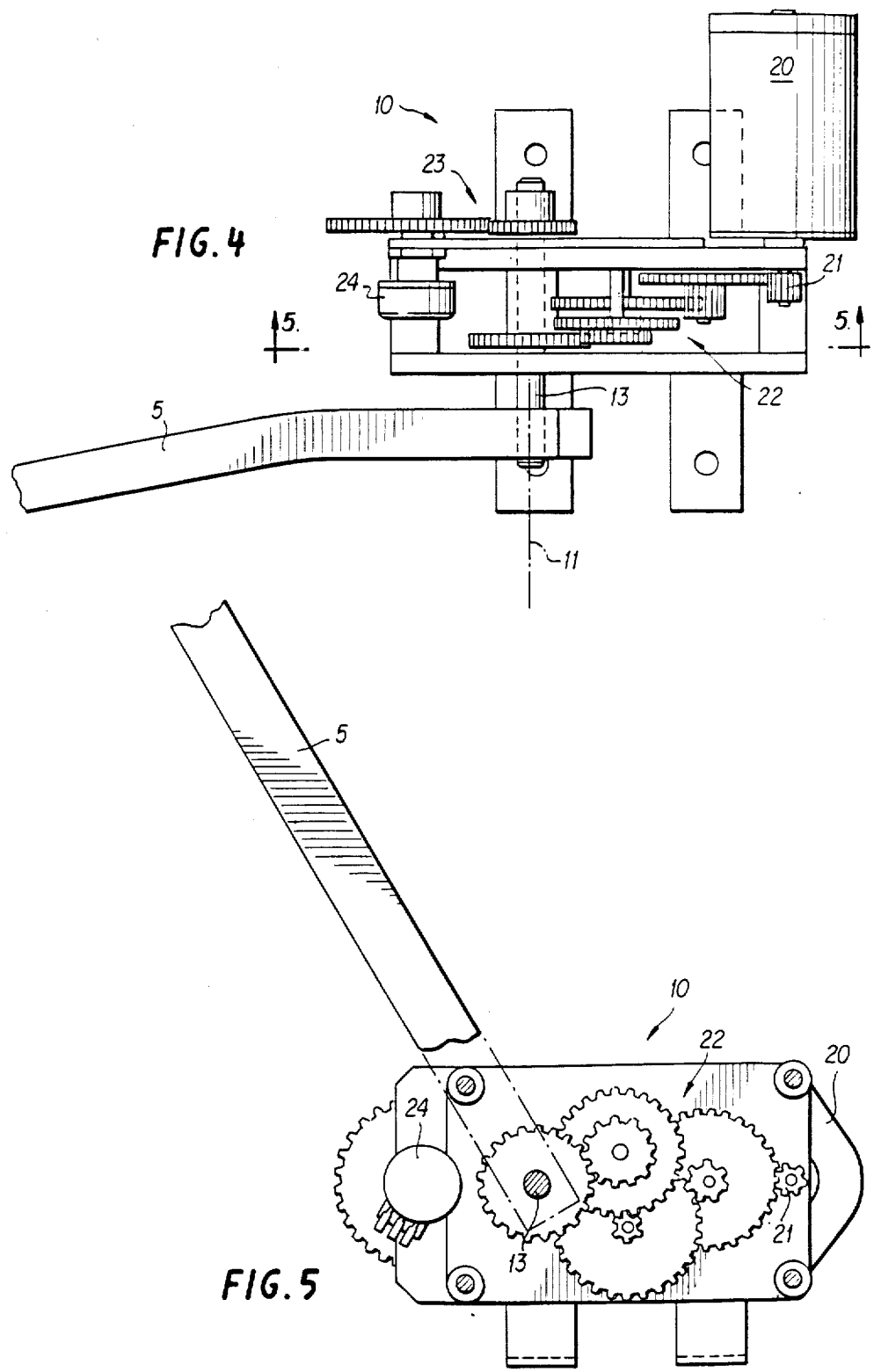

MULTI-CHANNEL RADIO-CONTROLLED ROBOTIC JOCKEY/MONITOR

BACKGROUND OF THE INVENTION

1. Field of the Invention

This invention relates to apparatus for allowing an operator to robotically control an animal, to monitor conditions in the vicinity of an animal, and to establish communications between the operator and the animal or others in the vicinity of the animal.

2. Discussion of the Background

Various breeds of horses and many other animals are either too small or of such physical stature that they cannot carry the weight of a human rider. Even when this is not the case, when animals are to be trained, it can be advantageous to begin training of the animal when the animal is of such an age and size that it may not yet be ridden by a human. Also, many people who would like to ride a standard horse or other large animal cannot do so because of their own physical limitations or disabilities.

U.S. Pat. No. 4,304,193 of Madden discloses an apparatus for achieving a limited amount of physical control over a reined animal. The Madden patent describes the use of an electronic transmitter for generating and emitting a control signal which is detected by an animal-handling mechanism associated with the animal for physically manipulating the animal to control its movement. The animal-handling mechanism includes motors which may be turned either on or off for selectively retracting reins or playing them out at a substantially constant rate. The Madden patent further discloses that a speaker box may be provided for orally communicating from operator to animal. There is need for an apparatus that more closely simulates the presence of an actual human rider on the animal in order to provide a greater number of possible control functions and increased precision in all control functions.

In the past, it has been known to monitor or maintain surveilence of an area for security purposes by using animals. One example of this practice is the use of guard dogs. Another example is a rider on horseback patrolling the perimeter of a large area. There exists a need for an apparatus to expand the possibilities in which such security may be maintained by some means other than routine human patrol yet which also provides for enhanced detection and flexibility of response by simulating the presence of a human to the extent needed by the particular function being performed.

SUMMARY OF THE INVENTION

In its broadest sense, the invention comprises equipment for telecommunications between a human operator and specific equipment mounted on a distant animal for performing specific functions at the location of the animal, the nature of the equipment being dictated by the specific functions desired to be performed.

In one preferred embodiment, the apparatus can be used for robotically (i.e., physically) controlling the actions of the animal with a degree of precision and measure of versatility not previously achieved. The robotic function may be supplemented by remote sensing. Various combinations of the disclosed apparatus may be used to create a plurality of embodiments of the invention, either with or without the robotic control means. In the absence of the robotic control means, the remote sensing means (which may include 2-way communication) may be relied upon to perform the specific functions. In all embodiments, the goal is to simulate the presence of a human being to the extent necessary for the task, while avoiding the limitations inherent in having a human being present.

When the robotic means are employed, the invention comprises means for physically controlling the actions of a reined animal. It is capable of training and controlling both large and small animals which, by way of non-limiting examples, may be standard horses, miniature horses, or even robotic decoys or machines. Superior control is achieved by more accurately simulating the presence of a rider and by providing both the operator and the animal with enhanced information.

The invention also includes a failsafe mechanism that may be used on an emergency basis to prevent damage to the animal or to the equipment if the equipment should malfunction or if the animal should panic and become uncontrollable.

Alternative embodiments of the invention may omit the robotic manipulation. These may be used with free-ranging animals, animals trained to follow voice commands, or animals trained to follow a fixed path. These embodiments are useful in security applications, in which a remote operator is provided with video or audio feedback, or both, of conditions in the area of the animal as well as any reactions of the animal itself to the conditions it encounters.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 4 shows a top view of one of the rein arm driving units.

FIG. 5 shows a front view, partly in section, of the rein arm driving unit of FIG. 4.

DETAILED DESCRIPTION OF THE PREFERRED EMBODIMENTS

Figure 1:
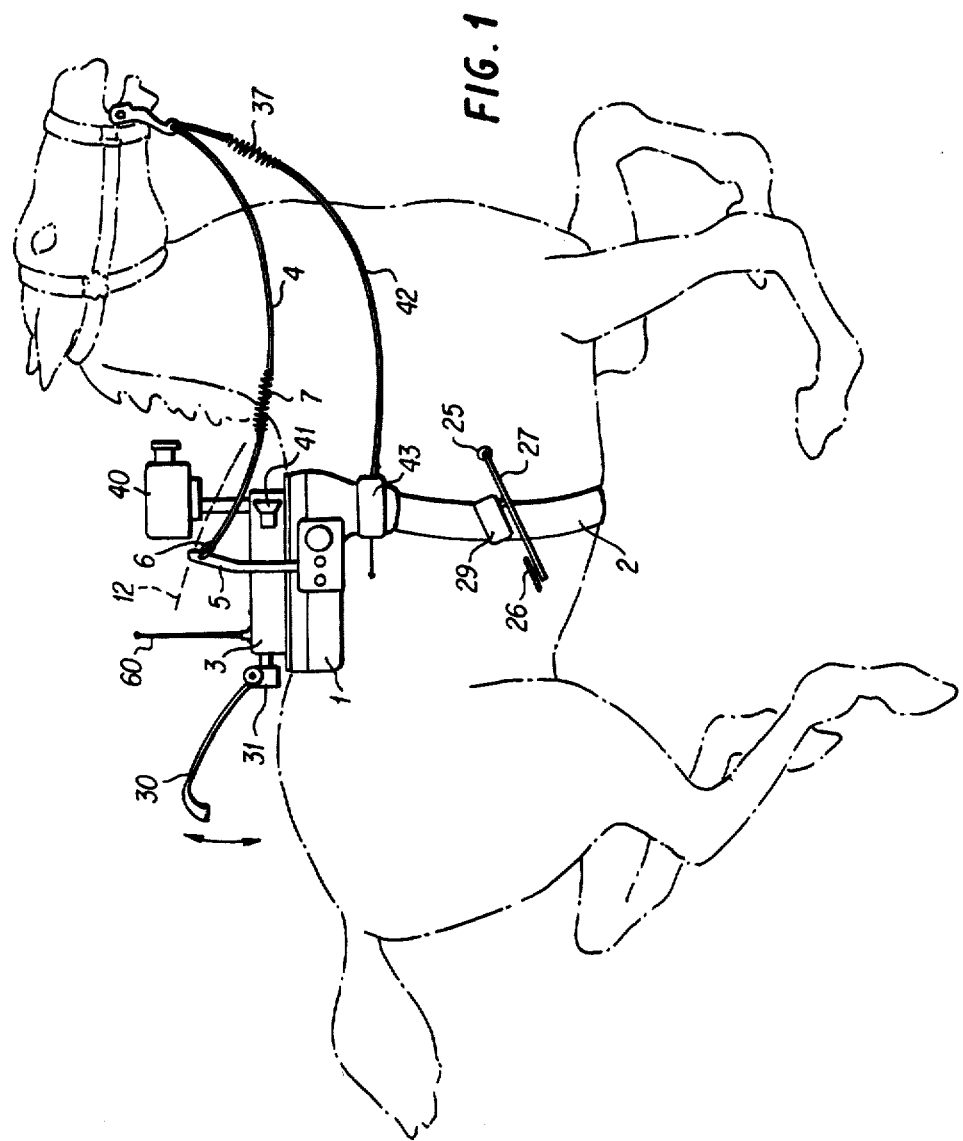
FIG. 1 is a side view illustrating the various animal-mounted components according to the first preferred embodiment, as mounted on a reined animal.

A more complete appreciation of the invention and many of the attendant advantages thereof will be readily obtained as the same becomes better understood by reference to the following detailed description when considered in connection with the accompanying drawings, and more particularly to FIG. 1 thereof, there is shown a portion of the equipment of the first preferred embodiment of the invention, in which mounting means includes saddle 1 and girth 2 for mounting the equipment on an animal, illustrated as a horse. The exact design of the mounting means will vary, depending upon the animal. Mounted on saddle 1 is housing 3 for housing portion of the battery-powered electronic components to be described later.

The animal is controlled by two reins 4 (one of which is shown), attached at one end thereof to respective ends of two rein arms 5 (one of which is shown), using any appropriate means such as rings 6. The other ends of the reins are attached to the head of the animal in a conventional manner. Rein springs 7 protect both animal and equipment from sudden head jerks of the animal.

Each rein arm 5 is mounted in one of two rein arm driving units 10, fixed on the mounting means on opposite sides of the animal. The lower end of each rein arm 5 is mounted in rein arm driving unit 10 for pivoting motion about an axis 11 (FIG. 4), whereby the rein arm upper ends (to which the reins are attached) move back and forth along arcuate path 12, shown in phantom in FIG. 1. Arcuate path 12 extends upwardly and rearwardly of the animal, so that the motion imparted to the reins 4 by the rein arms 5 closely simulates the hand and arm motion of a human rider. This motion in turn imparts components of force to the head of the animal in directions that are optimum for control purposes. If desired, the rein arms may be angled outwardly from the animal to provide an outward component of pull and increased spacing between the ends of the reins.

Figure 6:
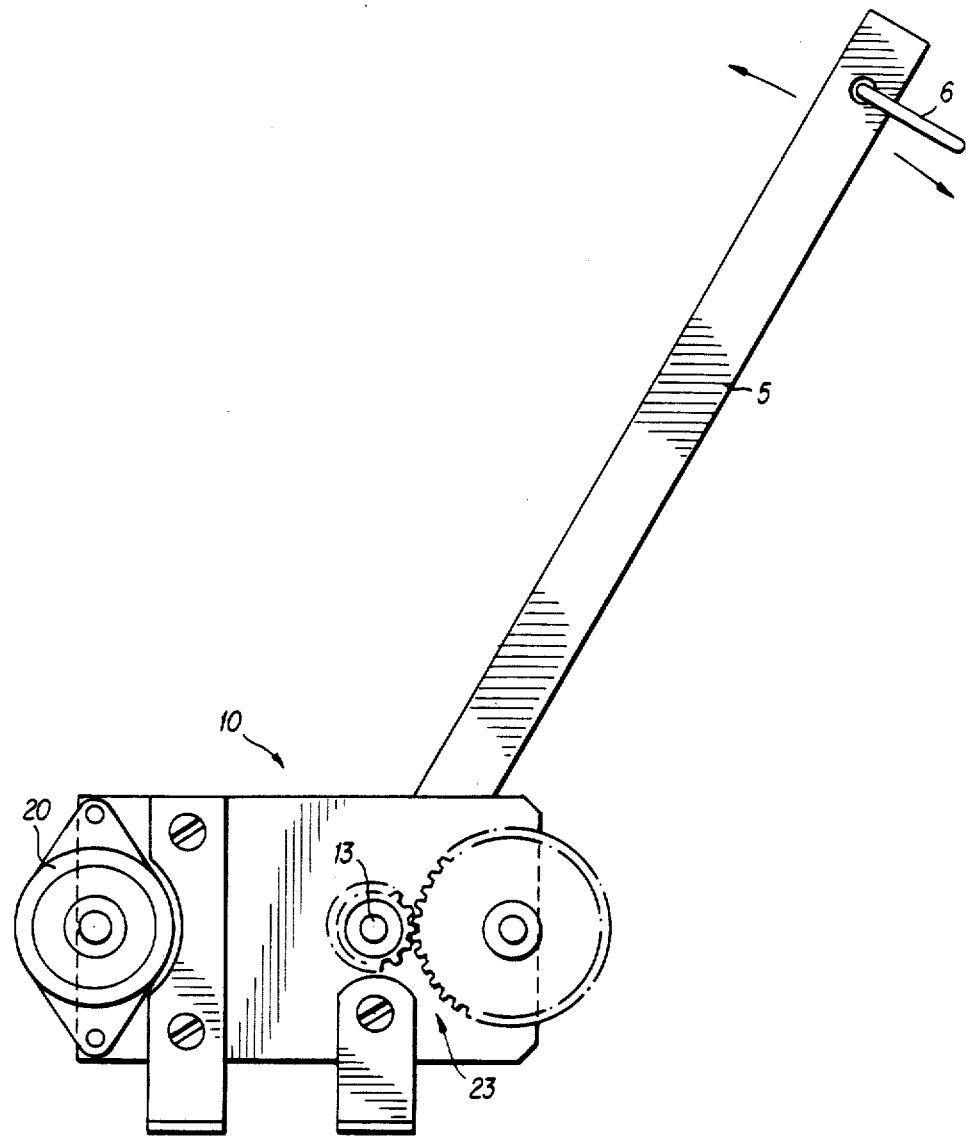
FIG. 6 shows a rear view of the rein arm driving unit of FIGS. 4 and 5.

With reference to FIGS. 4–6, each of the rein arm driving units 10 comprises a high torque rotary output servomechanism including a rein servomotor 20, thereby providing advantages to be described later. Gear 21 on the output shaft of rein servomotor 20 drives reduction gear train 22 which, in turn, drives output shaft 13 to which rein arm 5 is fixedly attached. The axis of output shaft 13 is the pivot axis 11. The rotation of output shaft 13 drives gearing 23, which, in turn, drives the shaft of rein feedback potentiometer 24.

Figure 3:
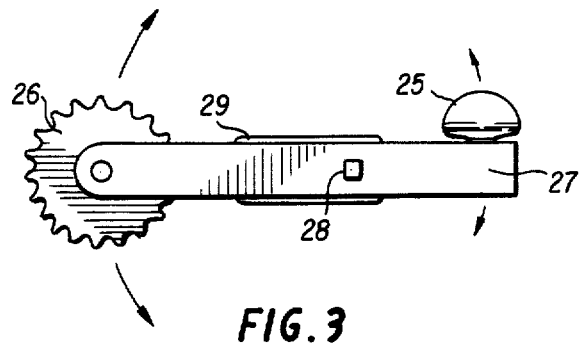
FIG. 3 is a bottom view of the side contacting means and side contact arm as shown in FIG. 1.

Disposed adjacent opposite sides of the animal are at least one, and preferably two, side contacting means movable toward and away from the sides of the animal to selectively contact the animal so as to provide enhanced control of the animal. In FIGS. 1 and 3, the side contacting means are illustrated in the preferred forms of a knee pad 25 (so-called because it simulates the knee-contact action of a rider) and a spur 26. These side contacting means are disposed on opposite sides of a side contact arm 27, which in turn is mounted on a shaft 28 of side contacting driving means 29, which also are servomotors. These side servomotors, one on each side of the animal, are selectively driven to rotate in either of two directions so as to bring either the knee pad 25 or the spur 26 into contact with the side of the animal. When the animal is a horse, the side servomotors 29 preferably are mounted on the girth 2 of the mounting means in such a manner that the side contact arm 27 is inclined with respect to the ground as illustrated in FIG. 1, so that the knee pad 25 will contact the shoulder of the horse and the spur 26 will contact the flank. Other types of side contacting means may be appropriate for other animals.

Crop 30 is attached to crop servomotor 31, which may be mounted on the saddle 1 or on the housing 3. The crop servomotor 31 may be selectively actuated to cause the crop to arc downwardly to contact the animal for urging forward or for discipline.

Also shown in FIG. 1 are environment sensing means including video camera 40 and audio transducer 41 (i.e., speaker-microphone). If desired, the microphone and speaker may be separate units.

In the event of equipment malfunction or failure, or in the event of the animal's panicking and becoming uncontrollable, the animal may nevertheless be controlled on an emergency basis by operating a failsafe system. The failsafe system includes a single head-pulling member 42, which preferably takes the form of a flexible line, independent of the reins, attached to the head of the animal, and extending rearwardly along one side of the animal. Head-pulling member 42 extends rearwardly to retracting means 43 which, in the case of a horse, would preferably be mounted on the side of the horse such that, when the retracting means 43 is actuated to retract the head-pulling member 42, the head of the horse is pulled around and downwardly. Spring 37 protects both animal and equipment from sudden head jerks of the animal. Following actuation, the retracting means 43 should maintain the head-pulling member 42 in its retracted state, forcing the animal to move in a harmless, circular path, thereby preventing damage to the animal or to the equipment until assistance is available.

The failsafe system has a battery-operated power supply system that is independent of the power supply for the remainder of the equipment and therefore is dedicated to the operation of the failsafe system. Hence, the failsafe system will work even in the event of a power failure of the other electronics.

Retracting means 43 may include a winch and winch actuating means.

Antenna 60 supports telecommunications between the equipment on the horse and the equipment contained in remote housing means 61 (FIG. 2) having an antenna 62. In the form illustrated in FIG. 2, the remote housing means 61 is easily portable and can be held in the hands of an operator during operation of the illustrated controls. It is to be understood, however, that the remote housing means 61 may physically comprise more than one box for housing equipment used by an operator. For example, the operator audio section 112 (FIG. 7) may be contained in a physically separate remote housing means 61.

Figure 2:
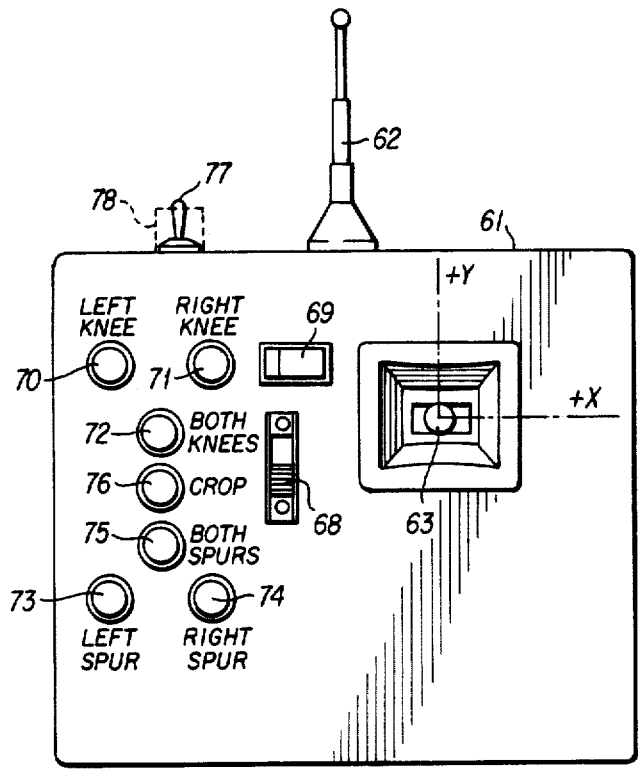
FIG. 2 illustrates a hand-holdable enclosure and the various operator-controllable input means according to a first preferred embodiment of the invention.

Also shown in FIG. 2 is operator-controllable rein arm input means in the form of a rein control joy stick 63. The rein control stick 63 has a neutral position at "zero" of the X-Y coordinate system illustrated in phantom. The rein control stick 63 is manually movable to any position within its operational range. The locus of points defining the outer limit of the operational range of the rein control stick 63 will define an imaginary closed geometric figure when viewed from the direction of FIG. 2, the imaginary figure being centered at zero of the coordinate system.

Through the use of electronics to be described later and through use of the rein servomotors 20, each position of the rein control stick 63 uniquely defines a configuration of the ends of the rein arms 5 at which the reins are attached. With reference to the coordinate system of FIG. 2, if the rein control stick 63 is positioned such that Y is at its maximum positive value and the value of X is zero, both rein arms will be in their position of maximum forward travel toward the head of the animal. If the rein control stick 63 is positioned such that Y is at its maximum negative value and the value of X is zero, both rein arms will be in their position of maximum rearward travel. If the value of Y is zero and the value of X is maximum positive, the right rein arm will be in its fully rearward position and the left rein arm will be in its fully forward position. If the value of Y is zero and the value of X is at its negative maximum, the left rein arm will be fully rearward and the right rein arm will be fully forward. If both X and Y are zero, both rein arms are at mid-points of their ranges of travel. In any other position of the rein control stick 63, the stick will have some X component and some Y component, so that the rein arms 5 will be proportionately positioned accordingly by servomotors 20.

Accordingly, as shown in FIG. 2, left movement of the stick pulls the left rein back and relaxes the right rein to turn the horse to the left. Right movement of the stick provides the opposite rein movement for a right turn. As the operator pulls back on the stick, both reins are pulled tighter to slow, stop or back up the animal, and forward stick motion relaxes both reins to allow the animal to go forward.

Therefore, the apparatus provides true proportionality between the amount of travel of the rein arms and the position of the rein control stick 63. If the stick 63 is moved a small amount, the rein arms move only a small amount. Also of great importance is that the rate of movement of the rein arms is proportional to the rate of movement of the rein control stick 63 during ordinary use within the response limits of the apparatus. These functions provide superior "feel" to the user and, of equal importance, imparts a natural "feel" to the animal. The operator intuitively knows the configuration of the reins 4 by the position of the control stick 63. In addition, because the control stick is self-neutralizing (spring-loaded to "zero" in both axes), the operator may release the stick, and the reins will assume a straight ahead or "neutral" setting. Also, the two functions of left/right turning plus loose/tight reins are electronically additively mixed together at the command transmitter so that any combination of rein control may be obtained by simple manipulation of the rein control stick and complete, proportional control of the reins is maintained. Finally, because of the intuitive correspondence between the position of the rein control stick 63 and the configuration of the reins 4, the use of the control stick 63 is comparatively easy for an operator to learn.

Also shown in FIG. 2 are operator-controlled side contact input means for causing motion of the side contact member such as knee pad 25 and spur 26. These side contact input means include "left knee" pushbutton 70 for causing the left knee pad 25 to contact the animal, "right knee" pushbutton 71 for causing the right knee pad 25 to contact the animal, "both knees" pushbutton 72 for causing both knee pads 25 to contact the animal, "left spur" pushbutton 73 for causing the left spur 26 to contact the animal, "right spur" pushbutton 74 for causing the right spur 26 to contact the animal, "both spurs" pushbutton 75 for causing both spurs 26 to contact the animal, and "crop" pushbutton 76 for causing the crop to contact the animal.

The combination of rein controls 63 and pushbuttons 70–76 provides a means of control that is not so complex as to overburden the user in learning to use the apparatus or in actual operation by an experienced user. The layout illustrated in FIG. 2 provides additional intuitive feedback to the operator because the positioning of the pushbuttons 70–76 is analogous to the operation being performed. For example, "left knee" pushbutton 70 is positioned forward on the remote housing means 61, as is the left knee pad 25 positioned forward of the left spur 26 on the animal.

The failsafe mechanism is actuated by the operation of emergency input means in the form of failsafe switch 77 located on remote housing 61. Failsafe switch 77 may advantageously be provided with protective cover 78 to avoid inadvertent operation.

Remote housing means 61 may further be provided with power off/on switch 68 and battery condition indicator 69, as shown.

Figure 7:
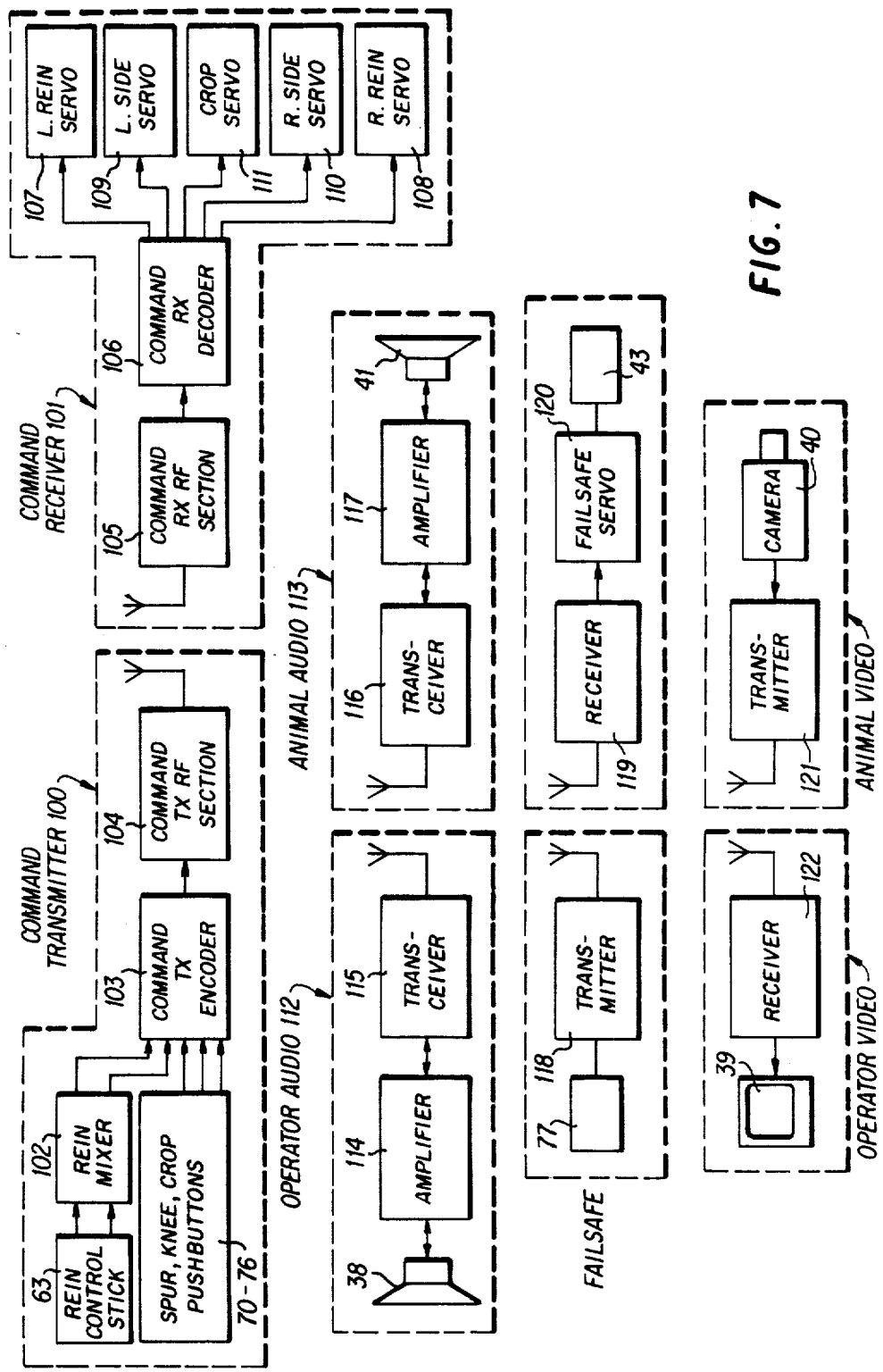
FIG. 7 is a block diagram illustrating the major electrical components according to the first preferred embodiment.

FIG. 7 illustrates schematically the major electrical components, with phantom lines used to illustrate both the functional groupings of the various components and the demarcation between those components mounted on the animal and those mounted in the remote housing means. Broadcast communications between operator and animal are represented by antenna symbols.

The components involved in governing the movement of the rein arms 5 and side contacting means 25, 26 are shown as functionally grouped in a command transmitter 100 and the command receiver 101. In the command transmitter, output of the rein arm input means 63 is fed to mixer 102 and then to encoder 103. Likewise, the signals from the seven additional input means (i.e., the pushbuttons 70-76) also are fed to the encoder 103. The output of the encoder is converted to a broadcast signal in the command transmitter RF section 104. The broadcast signal is received at the animal by the command receiver RF section 105, is then decoded in command decoder 106 and fed to various servoamplifiers for driving the various servomotors. In particular, the signal from command receiver decoder 106 is fed to left rein servoamplifier 107, right rein servoamplifier 108, left side servoamplifier 109, right side servoamplifier 110, and crop servoamplifier 111. The above components of the command transmitter and the command receiver will be described in more detail later.

Also illustrated in FIG. 7 are means for establishing the preferred two-way form of audio communication, including the operator audio section 112 and the animal-mounted audio section 113. Operator audio section 112 includes audio transducer (i.e., speaker/microphone) 38 for use by the operator. Because the audio transducer 38 serves as both a microphone and speaker, it comprises both environment sensing means and monitoring means. Audio transducer 38 inputs to and is driven by audio amplifier 114 which, in turn, inputs to and is driven by audio transceiver 115. Two-way broadcast communications are established between audio transceiver 115 and audio transceiver 116, the latter being located on the animal. (Audio transceivers 115 and 116 may, for example, be COBRA HC200 transceivers.) Audio transceiver 116 drives and is driven by audio amplifier 117. Audio amplifier 117 drives audio transducer 41. Because audio transducer 41 is both a speaker and a microphone, it comprises both environment sensing means and means for converting a signal from audio amplifier 117 into a form capable of being sensed by a living being (human or animal).

Also shown schematically in FIG. 7 is the failsafe system, in which the emergency input means in the form of failsafe switch 77 provides an input signal to failsafe transmitter 118. Failsafe transmitter 118 is powered by a dedicated power supply. It broadcasts to failsafe receiver 119 which, in turn, drives failsafe servoamplifier 120. Failsafe servoamplifier 120 drives the retracting means 43 for retracting the head-pulling member 42. Failsafe receiver 119, failsafe servoamplifier 120 and retracting means 43 also are provided with a dedicated power supply. The retracting means 43 is designed for one-time operation and is manually reset before the apparatus is used again. Further details of the failsafe system will be disclosed later.

FIG. 7 also illustrates schematically the video telecommunications, which may comprise conventional equipment. Environment sensing means 40 in the form of a video camera mounted on the animal inputs to video transmitter 21, also mounted on the animal. The transmitted video signal is received at the operator by video receiver 122 and displayed for monitoring by the operator on monitoring means 39, which may be a CRT or other type of video display.

Before a detailed description of the electronics, various advantages and features of the above described embodiment and modifications thereof will be described.

One specific use of the invention relates to the controlling and training of horses. That portion of the apparatus mounted on a horse has a low center of gravity and is not subject to shifting on the animal. Furthermore, the weight of the apparatus may be as low as 20 pounds, so that training of horses can begin at an earlier age, without stress or injury to the animal. Training may begin between two and three months earlier than with a human rider, thereby providing a significant economic advantage. In addition, the horse may be trained by a skilled trainer who is unable to ride, perhaps because of age or infirmity. An additional advantage to the trainer is that the trainer may be in direct control. Previously, trainers had sometimes been required to instruct jockeys, who did not always faithfully carry out the instructions of the trainer.

An additional advantage of the invention is that it provides uniformity during training. Human riders differ one from the other, and even the same rider may appear different to the horse from one day to the next. Variations in weight, stress, attitude, intensity, technique, vocal commands, and other human characteristics provide different inputs to the horse. This can adversely affect training. In contrast, the current invention always feels the same to the horse, thereby imparting consistency to the training.

The specific advantages of the servo-controlled rein control arms have been discussed above. The addition of the knee and spur controls both makes it possible to control the animal in ways not achievable by use of rein-control alone and further enhances such control that may be possible using rein control alone. In particular, the knee pads 25 aid in directional turns and dressage movements, and the spurs 26 are used to urge forward and also to establish gaits and dressage movements.

For certain purposes, it will be desirable to employ two side servomotors on each side of the animal rather than one per side as illustrated in FIG. 1. In such a case, the operation of the knee pads 25 and spurs 26 may be independently controllable. This would allow simultaneous knee and spur operation, useful in certain specific dressage and parade applications.

Additional enhancement of control is provided by two-way audio telecommunication. The usefulness of two-way audio is by no means limited to examples in which the animal is a horse. However, for purposes of example only, references will be made to the case in which the animal is a horse.

Audio communication from the operator to the horse has previously been suggested in the above-cited Madden patent. Such may be used for urging a horse forward, to stop, to back up, and for otherwise reinforcing the physical control. The current invention additionally contemplates the use of audio telecommunication from the horse (or the area of the horse) to the operator, in order to monitor the vocal reaction of the horse to certain situations in training or in routine operation. Thus, communications in both directions enhances control of the animal. Furthermore, with the addition of voice control, it is possible to take certain actions not achievable by rein, knee and spur control alone.

The invention has many uses, and is by no means limited to training. It can be used in parades, for entertainment, and even competition in which many operators may control many animals to compete for prizes based on superior skills. Such applications are not limited to horses.

In addition, the current invention has security applications, in which an animal could perform a function that is impractical or unsafe for a human. Different embodiments of the invention may be used in various security applications, both with and without the rein and side contact control. Indeed, the robotic control may be omitted entirely, and reliance may be made on the audio or video, or both.

Once such application might be the use of an animal to walk the perimeter of an area desired to be monitored for security purposes. The animal could be reined and under the direct control of an operator, in which case the video could be used by the operator for controlling the animal when it is out of sight, or an animal without reins could be used that is trained to walk a pre-determined path or that is allowed to roam at will. In any event, the two-way audio could be used not only to allow the operator to speak to the animal but also to allow the operator to monitor the reaction of the animal to warn of a threatening situation and to provide clues of the nature of the threat. The video allows the operator the opportunity to inspect visually the nature of the threat. If the threat is a human intruder or other animal, the audio would allow the operator to question a human intruder or to intimidate an animal intruder, respectively. Thus, the two-way audio communications serves the additional purpose of enhancing the flexibility of the response to be made to the situation.

It also is contemplated that the "environment sensing means" on the animal will not be limited to audio and video means. For example, there could be provided an atmospheric detector for sensing any unusual chemical compounds in the environment of the animal, or a proximity monitor, or both. The desirable goal of simulating the presence of a human being may be further enhanced by using a voice synthesizer to replace the controls manually operated by the user.

By way of non-limiting example, the electronics of the embodiment illustrated in FIG. 2 will now be described. It should be noted in advance that many frequencies are available for operation of this system, so a number of animals may be controlled simultaneously by different operators, or one operator may control several animals from a control console station. Furthermore, as mentioned above, the rein controls of the invention provide true proportionality. The above advantages are accomplished by pulse width encoding of the broadcast signal to provide up to seven separate proportional command channels on the same frequency, the signals of these channels having been mixed before being broadcast. This may be accomplished, for example, using a NE5044 programmable parallel input, serial output encoder integrated circuit, shown in FIG. 8. This circuit provides the above-mentioned seven channels. It may be used in the command transmitter encoder shown in FIG. 9. Because the present state of the art will support the simultaneous use of up to 30 frequencies, many units of the current invention may be used simultaneously in the same area.

The encoder will now be described in more detail.

The NE5044 is a programmable parallel input, serial output encoder containing all the active circuitry necessary to generate a precise pulse width modulated signal. The number of channels is externally programmable by grounding any unused control inputs. A multiplexed dual linear ramp technique is used to provide excellent linearity, minimal crosstalk and low temperature drift. An onboard 5 volt regulator is used to eliminate power supply sensitivities and has up to 20 ma current capability for driving external loads.

The multiplexer functions as a strobed voltage follower so that each input, when active, appears as a high impedance input and transfers the input voltage to the output. Only one of the seven inputs is active at any time and when a given input is inactive, it appears as an open circuit. The high impedance multiplexer inputs eliminates loading on control inputs and simplifies mixing circuits where several controls may be mixed onto one input.

Internal voltage clamping prevents encoder malfunction if any input is shorted to supply, ground or open circuited. The remaining channels will continue to be encoded. This feature eliminates catastrophic failures due to failure of a control pot due to an open condition or due to a short circuit condition.

The constant current generator is a bidirectional current source whose current, $I_c$, is set by the external resistor $R_I$. The current generator alternately charges and discharges the capacitor $C_{mux}$. An internal feedback loop maintains a constant current and very high output impedance. This yields a typical linearity error of voltage input to pulse width output for the encoder of less than 0.1%. An external capacitor, $C_I$, is required to insure stability of the feedback loop, and sets the current rate in conjunction with $R_I$.

Figure 8:
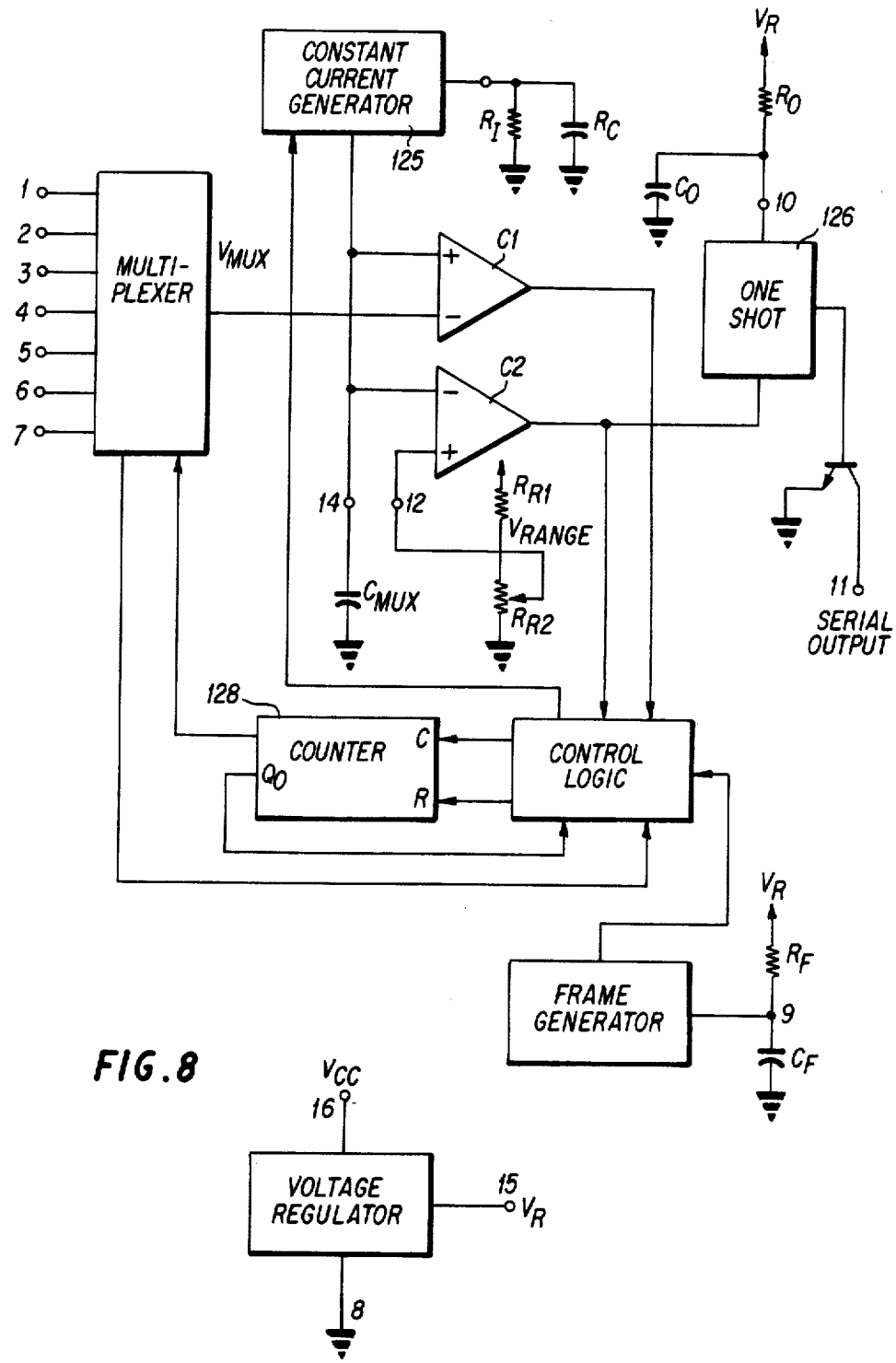
FIG. 8 is a block diagram illustrating the operation of an integrated circuit that may be used in the command transmitter encoder.
Figure 9:
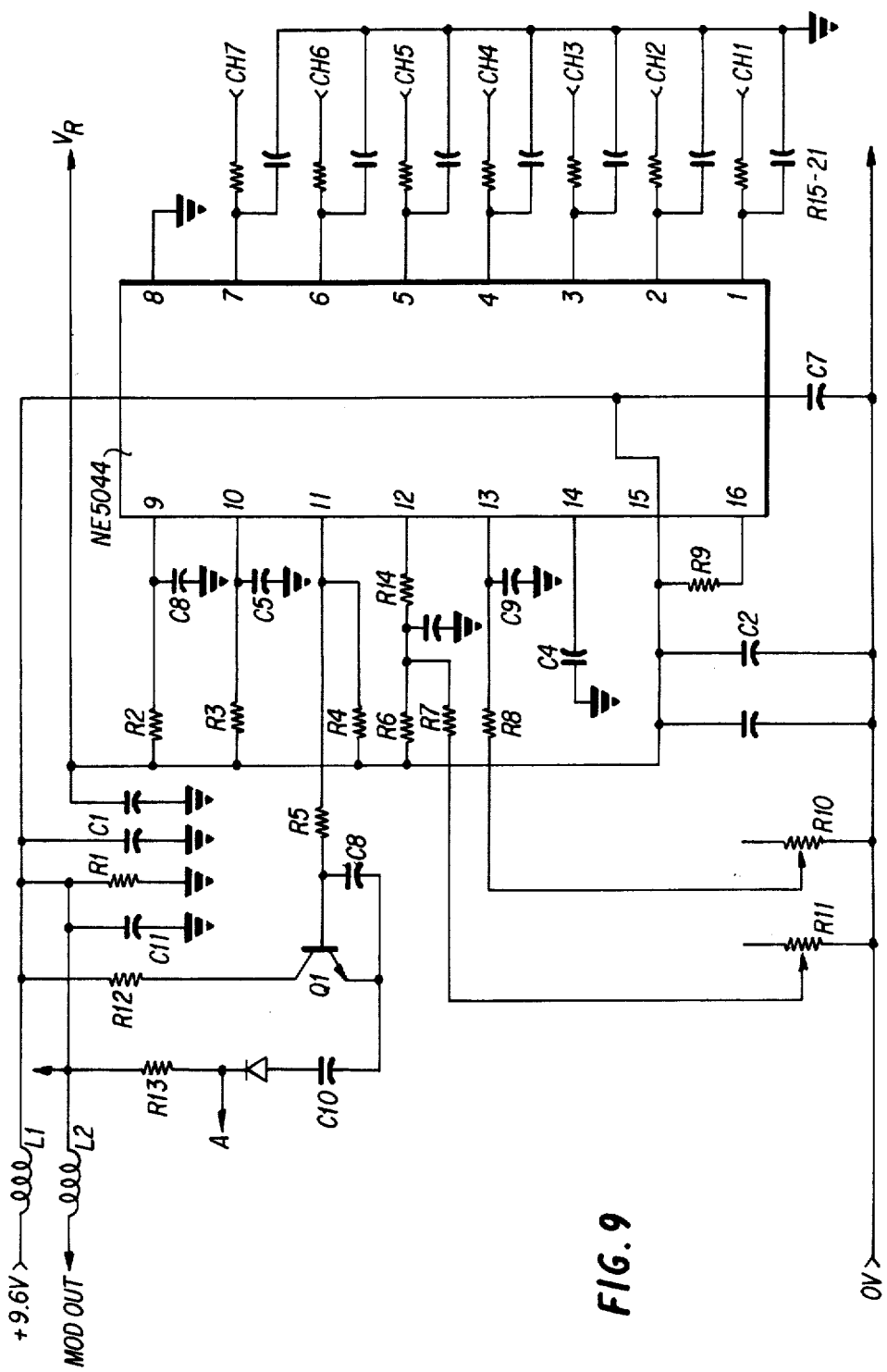
FIG. 9 shows the command transmitter encoder, incorporating the integrated circuit of FIG. 8.

Two high gain comparators, C1 and C2, compare the voltage across $C_{mux}$ with the multiplexer output voltage and the range input voltage. The comparators feed the counter control logic which in turn controls the counter and current generator. The operation of this loop is as follows:

When $I_c$ is positive (sourced from the current generator into $C_{mux}$) the capacitor linearly charges up until it reaches a voltage equal to the multiplexer output voltage. Assume this to be the voltage at pin 1, V1 (FIG. 8). At this time the output of C1 goes high which reverses the direction of $I_c$ (sinking into current generator from $C_{mux}$). $C_{mux}$ now linearly discharges until it reaches the voltage set on pin 12, $V_{range}$, determined by the divider network $R_{R1}$ and $R_{R2}$. At this time the output of C2 goes high which again reverses the polarity of $I_c$, clocks the counter and triggers the output one shot. $C_{mux}$ again charges up but now C1 goes high when $C_{mux}$ reaches V2, the voltage on pin 2 (FIG. 8). The resulting voltage waveform on $C_{mux}$ is a triangle wave whose positive peaks correspond to the voltages on pins 1 through 7 for the first through seventh peak and whose negative peaks are constant and equal to $V_{range}$. This waveform is shown in the first portion of FIG. 10.

Independent control of $I_c$ and $V_{range}$ allows the encoder to be tailored to the desired combination of input voltage changes and output pulse width changes.

The frame generator controls the encoder frame time. It can operate as an astable multivibrator. The encoder will generate a synchronizing pulse at the end of each frame. When $C_{mux}$ reaches the seventh positive peak it reverses and discharges to $V_{range}$. The counter is clocked to the state where $Q_o$ is high when $V_{Cmux} = V_{range}$. $C_{mux}$ again charges up but now the output of C1 is ignored, due to $Q_o$ being high, and charges up to $V_{clamp}$ and remains there. The encoder will remain in this state until a pulse from the frame generator is received. The frame generator operates in the astable mode producing a narrow pulse output. This pulse allows $C_{mux}$ to start discharging again. When $C_{mux}$ reaches $V_{range}$, the counter is clocked to the state where Q1 is high (channel 1) and the entire process starts over.

The frame period in this mode is $0.66 \times R_F C_F$ and is referred to as the fixed frame mode.

Figure 10:
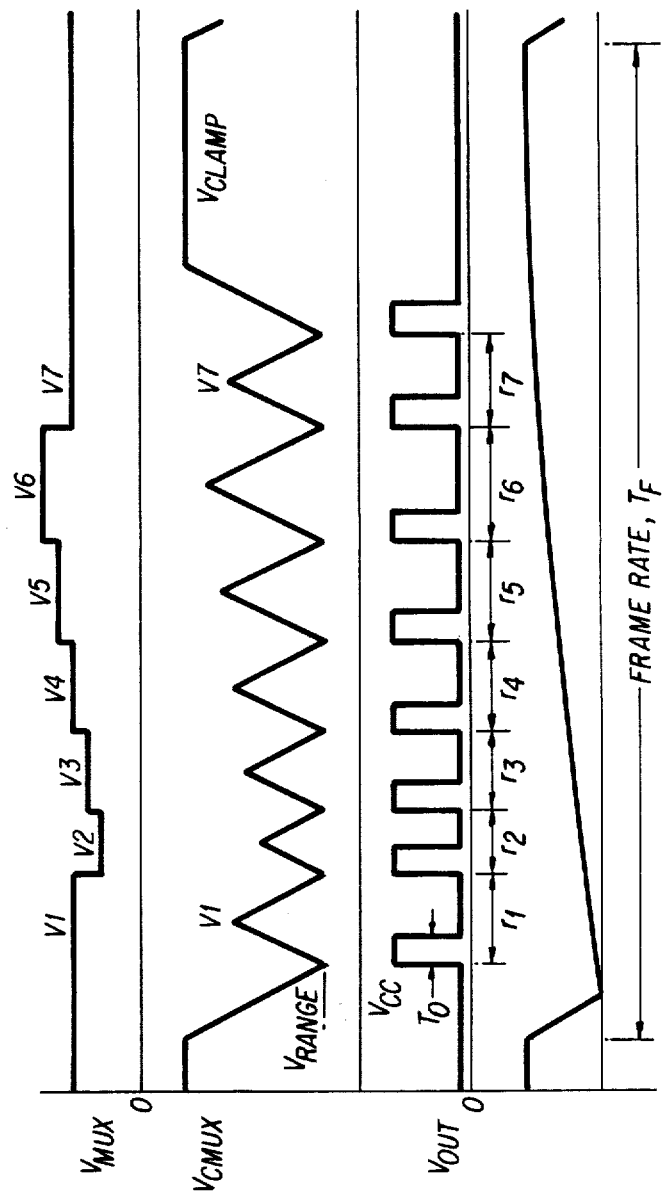
FIG. 10 shows waveforms generated by the integrated circuit of FIG. 8.

The output one-shot generates a positive pulse whose width is equal to $R_o C_o$. The output is an open collector, NPN transistor capable of sinking 25 ma. The waveforms produced are shown in FIG. 10.

An internal voltage regulator gives a constant 5 V($V_R$) out of pin 15. Pins 8 (ground) and 16 (+6−16 V) input the voltage source.

In order to correlate between the block diagrams and the encoder schematic, the following chart is furnished:

| | | |
|---|---|---|
| $C_0 = C_5$ | $C_F = C_6$ | $R_{R1} = R6$ |
| $R_0 = R_3$ | $R_F = R2$ | $R_{R2} = R7/R11$ |
| $C_1 = C_9$ | $C_{MUX} = C4$ | |
| $R_1 = R8/R10$ | | |

Referring to FIG. 10, R2 and C6 set the duration of a frame at a fixed 20 milliseconds (ms). C5 and R3 set the output modulation pulse width at a nominal 250 microseconds (us). A 250 us ramp appears at pin 10 and the pulse appears as a full $V_R$ (regulated 5 V) amplitude square pulse at pin 11. At pin 11, R4 and R5 set a bias for the base of Q1.

The divider network formed by R6 and R7/R11 sets the desired throw range of 1.5 ms neutral ±0.5 ms. The series resistance set by R8/R10 plus C9 at pin 13 interacts with C4 at pin 14 to set the nominal output control pulse width (not the modulation pulse) to a nominal 1.5 ms.

C1, C2 and C7 provide power supply filtering. R9 is a pull up resistor to insure proper regulator start-up.

Various 0.001 mf or 100 pf capacitors (unnumbered) are provided for RF bypass.

C8 shapes the output pulse from pin 11. Q1 inverts and amplifies the pulse to modulate the RF deck. The pulse is further shaped by C10 and the modulated signal proceeds through D1 and R13 to set the input level to the RF deck.

Pins 1 through 7 accept the seven control inputs; each input from control processing goes through a 100K resistor (R15–21) and has a 100 pf cap tied to ground to bypass and attenuate any RF feeding in from the processing networks. The high impedance of the multiplex switches means the input to each channel may take on many forms; the only requirement is that they all be conditioned to have the same end voltages, nominally 2.5 V±0.5 V.

Figure 11:
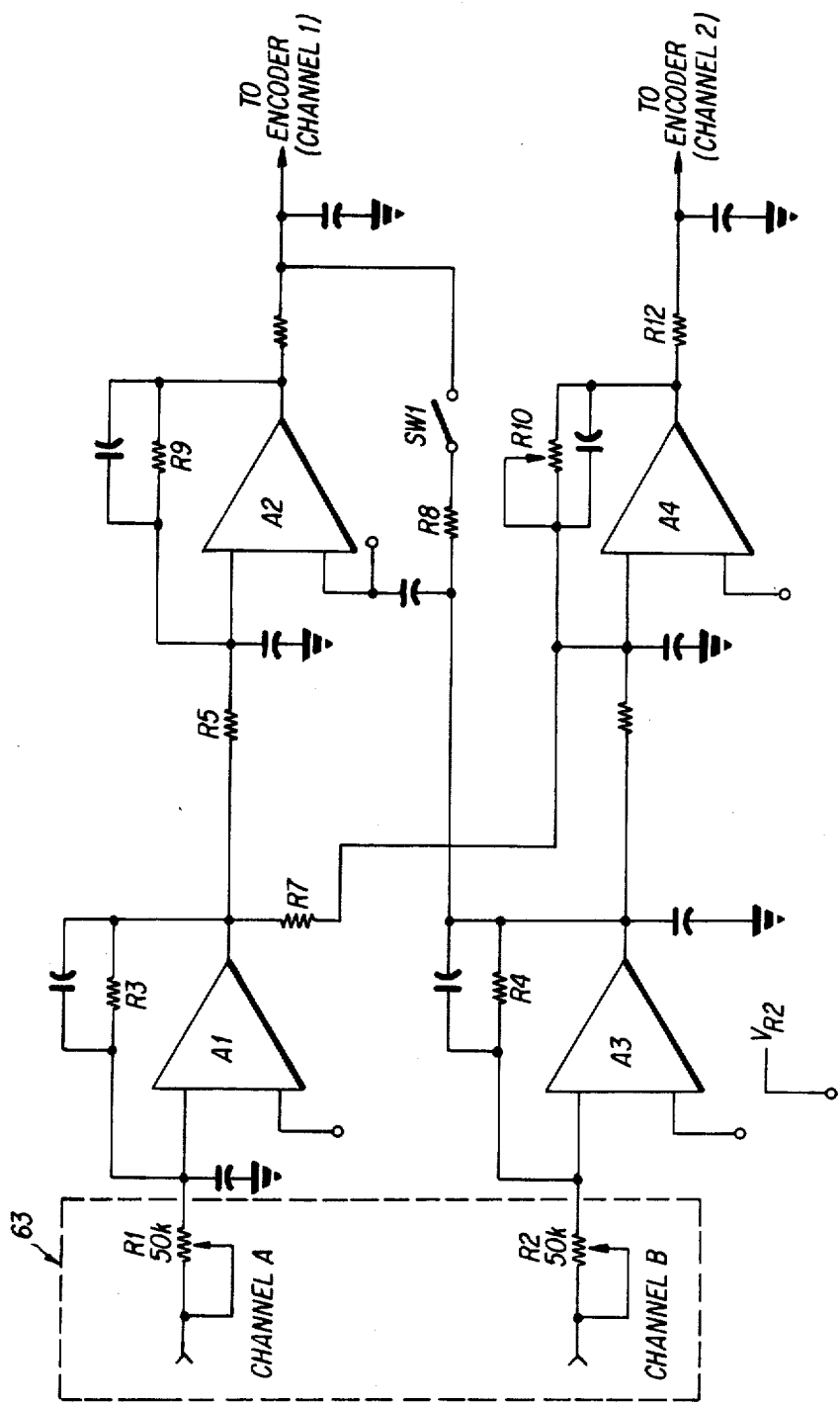
FIG. 11 is a schematic of the rein signal mixer.

As mentioned above, the signal from the rein arm input means 63 is fed to the command transmitter encoder. Signal conditioning for this signal is accomplished by the rein mixer 102, illustrated in FIG. 11. Variable resistors R1 and R2 change in value as the user moves the rein control stick along respective orthogonal axes X and Y.

Examining first the action that takes place from channel B input; A1, R1 and R3 act as an inverting amplifier with relative gain set by R1. The output from A1 is coupled to a second inverting amplifier formed by A2, R5 and R9 set at unity gain. This second amplifier reinverts the control voltage so that the servo moves in the same direction whether the mixer is switched in or out. R11 reduces the effect of control pot variations in linearity. The reader can visualize that if R1 were 51K, both amplifiers would produce unity gain and the input and output level would be the same.

The output from A1 is also routed to the other half of the mixer formed by A3, A4, and related components.

The channel A input is impressed on A3 which, with R2 and R4, forms another inverting amplifier with gains set by R2. However, the inverted output from A3 is routed via R8 to be summed with the output from A2 and the output from A2 is biased by the output from A3 to mix Channel A into Channel B.

Assuming the optional switch SW1 is closed for bidirectional mixing, the inverted output from A1 is routed to A4 via R7. R7 and R6 are equal in values so the relative gain of A4 remains the safe.

The output from A3 is also routed to A4, which, with R6 and R10 form another inverting amplifier. R10 permits varying the gain of this amplifier to adjust the differences in servo travel; i.e., balance the two servos. The reinverted output for channel B mixed into channel A leaves A4 via MR12. Again, the gain for channel A can be set to give unity or much less than unity gain.

Figures 12, 13:
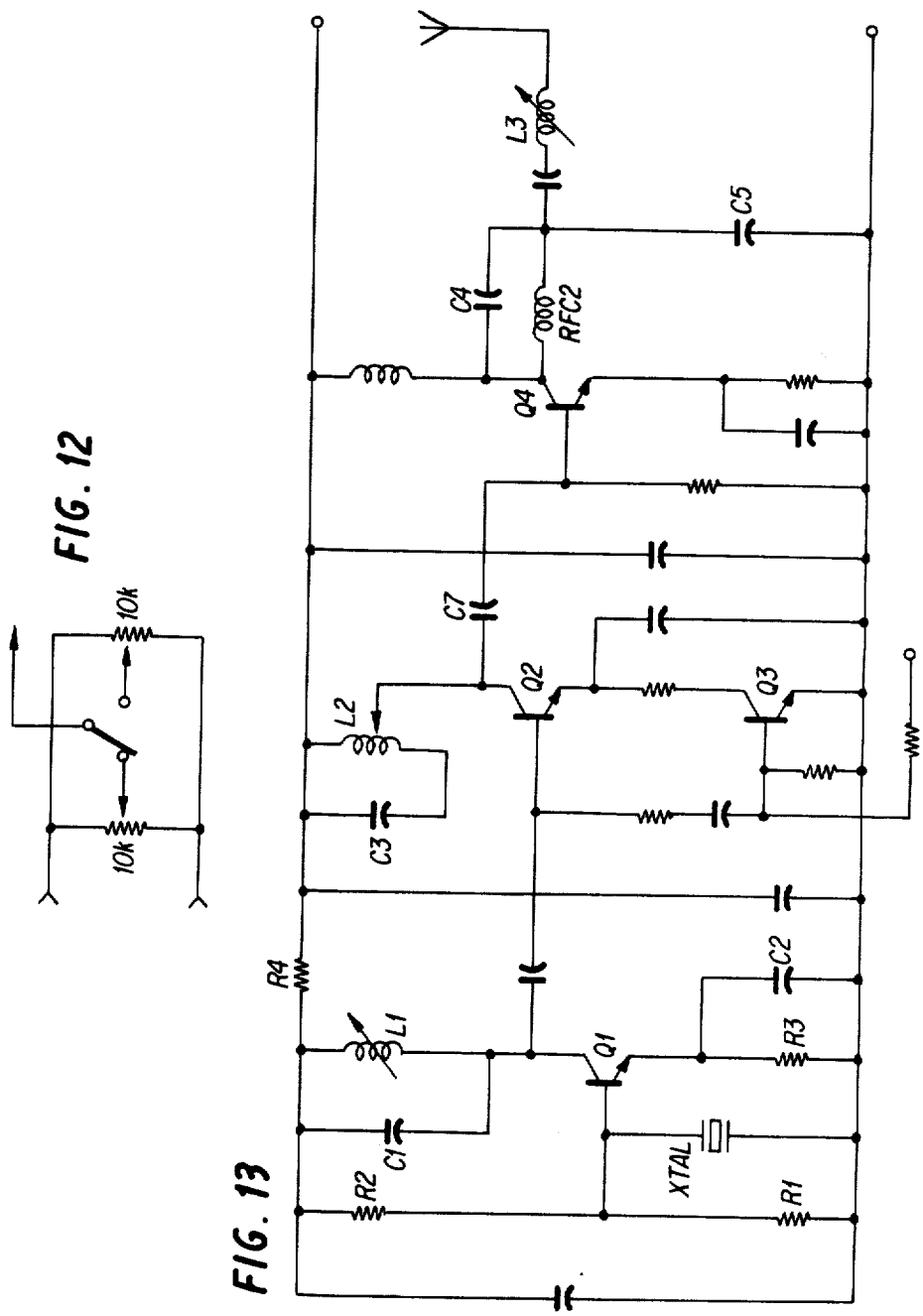
FIG. 12 is a schematic representative of each of the pushbuttons shown in FIG. 2 and the manner in which a signal from the pushbutton is inputted into the command transmitter encoder.
FIG. 13 shows a schematic of an RF transmitter that may be used in the command transmitter and also in the failsafe transmitter.

FIG. 12 illustrates one of the identical pushbutton inputs 70–76 and its manner of input to encoder 103. Input channels 3, 4 and 5 of the encoder are conditioned using the pushbuttons and 10K pots to make the servo position-adjustable when the button is pushed. By making this simple adjustment, the user may therefore vary at will the degree of travel of the crop and the side contacting means. Channels 6 and 7 are not used and are set with resistors to produce a 1.5 ms pulse.

The output of the encoder 103 is fed to command transmitter RF section 104, illustrated in FIG. 13. The RF section 104 employs a crystal oscillator operating at the desired frequency (no doubling or tripling, etc.) to produce the unmodulated, unamplified RF. The oscillator is formed of R1, R2, R3, C1, C2, L1, Q1 and the crystal. R4 drops the supply voltage to the oscillator. The RF is coupled to an intermediate stage amplifier and modulator formed by Q2, Q3, L2, C3 and related loading resistors and shaping capacitors. From the modulator-amplifier, C7 couples the RF to the final amplifier, Q4, RFC-2, C4, C5, C6, and L3 form the final RF filter and loading for an antenna.

The RF section delivers a solid 600 milliwatts radiated output (1 watt into the final RF amplifier).

Figure 14:
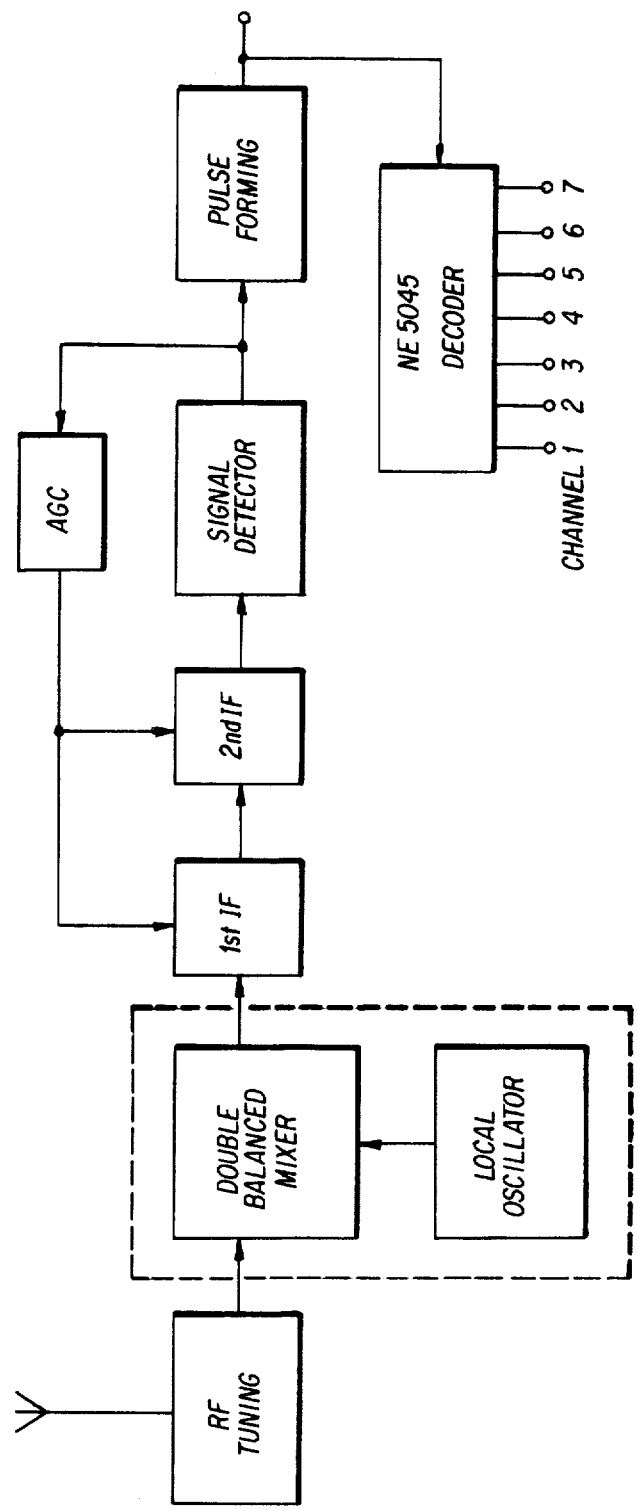
FIG. 14 is a block diagram of a receiver RF section and decoder that may be used in the command receiver and in the failsafe receiver.
Figure 15:
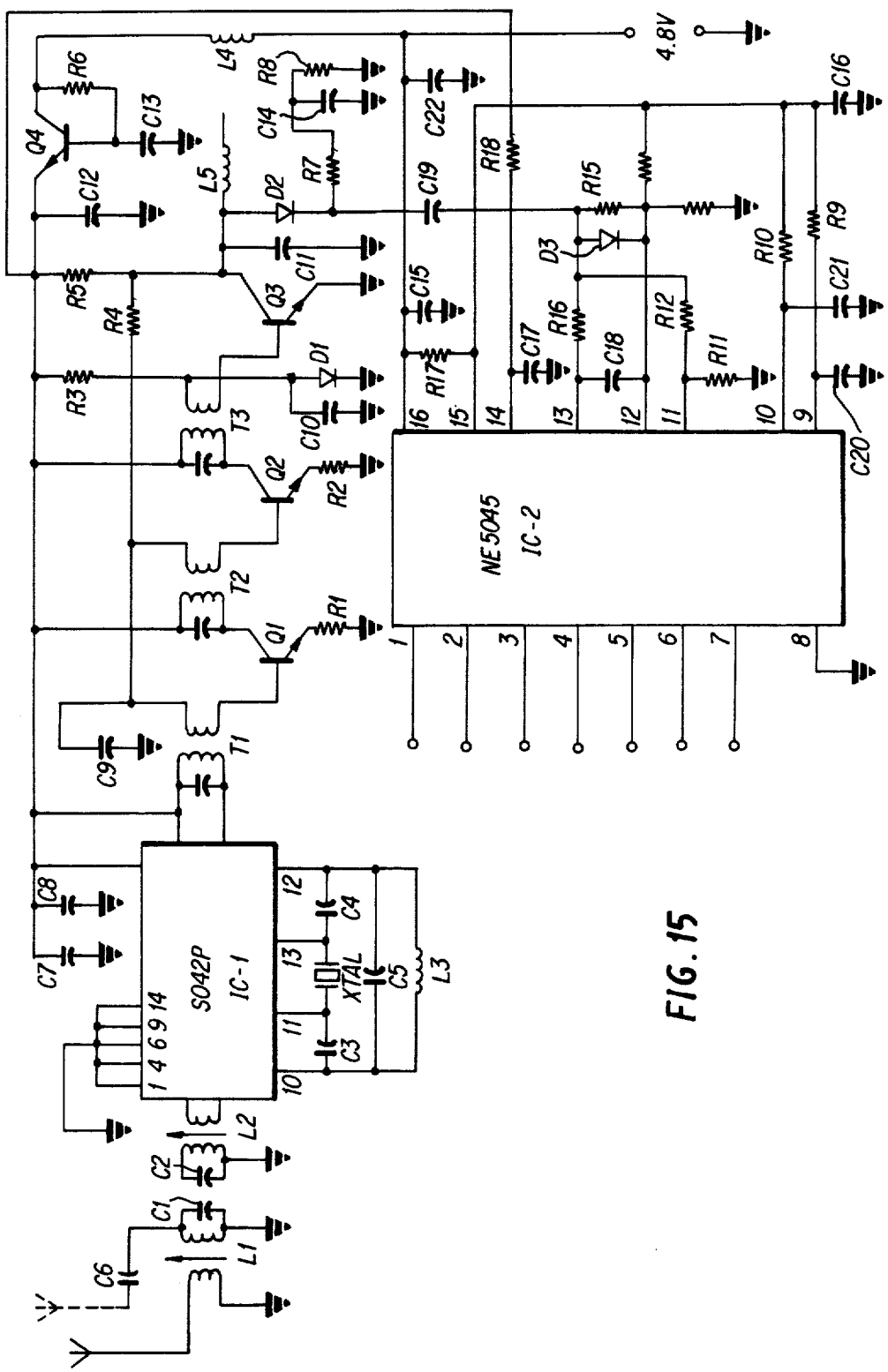
FIG. 15 is a schematic of FIG. 14.

The command receiver RF section 105 and decoder 106 are functionally-illustrated in FIG. 14, with a schematic thereof being shown in FIG. 15. The command receiver RF section may advantageously employ a Siemens SO-42P double balanced mixer in conjunction with a shielded, double tuned front end for excellent consistency, resistance to intermodulation, and low parts count.

The mixer and active components of both the local oscillator and mixer are contained in the SO-42P. The RF tuning, i.e., front end, uses two parallel pass filters (L1, C1) and (L2, C2) which are inductively close coupled. This double tuned front end provides the proper front end selectivity even when adjacent channel transmitters are nearby. Further, the RF tuning coils are enclosed in shielded cans for better interference rejection, reduced self-radiation, and consistency.

The output from the secondary of L2 is fed directly to the double balanced mixer, SO-42P. The SO-42P, XTAL, C3, C4, C5 and L3 form the local oscillator. The local oscillator operates at one-half the nominal receiver frequency. The second harmonic of that frequency is 455 KHz above the transmitted frequency.

Two frequencies are mixed or "heterodyned" within the SO-42P: the transmitted signal and the local oscillator (LO) signal that is 455 KHz removed from the transmitted signal. For example, assume a transmitted frequency of 72.08 Mhz plus 455 KHz, or 72.535 MHz. The function of the double balancer mixer is to "mix" these two frequencies to produce a 455 KHz intermediate frequency (IF) that clearly is far removed from the transmitted signal. Thus, the simple use of heterodyning produces a tremendous increase in resistance to interference. Almost all R/C systems use a superhet receiver. When two separate frequencies are mixed, the following frequencies are produced:

+ the sum of the two frequencies (144.615 for our example)
+ the difference between the two frequencies or 455 KHz
+ the two original frequencies.

In order to provide the desired selectivity, we wish to work with only the 455 KHz IF frequency. By doing so, the selectivity of the receiver is increased from 100 KHz to 5 KHz. That is, it will reject all signals ±2.5 KHz removed from the transmitted frequency, unless they are of a much higher amplitude than the transmitted signal. The mixed signals (all three) appear at the primary of T1.

The IF strip consists of T1, T2, T3, Q1, Q2, and the load resistors R1 and R2. T1, T2 and T3 are IF transformers that are sharply tuned to pass only the 455 KHz±2.5 KHz IF signal.

The output from T3 is rectified, or "detected" by D1, R3, and C10 to recover the audio envelope transmitted. Q3 amplifies the pulse to an amplitude which is dependent on the signal input to the receiver; i.e., amplitude increases as signal strength increases. One can visualize that the output amplitude of Q3 would fluctuate continually as range and aspect to the transmitter changes. This is highly undesireable and would result in glitching and/or swamping of the receiver.

The above is prevented by coupling back the detected signal out of Q3. The output from Q3 is a series of pulses whose amplitude varies as mentioned above. These pulses are filtered by C9, R4, and C11 to present an automatic gain control (AGC) voltage that biases Q1 and Q2. As Q3 output increases (strong received signal) the DC level on the AGC line increases biasing Q1 and Q2 more toward ground and vice versa to keep gain essentially proportioned to signal strength.

Q4, R6, C12, and C13 form a "capacitance multiplier" that provides an outstanding power line filter for the RF section of the receiver. C13 (10 uf) tends to reflect any slight change in line voltage to the base of Q4 which amplifies the apparent capacitance from 10 uf by a factor of 60 to 100 to make C13 appear to be nearly 1000 uf. Any vestiges of ripple are then filtered by C12. The RF section and detector output are isolated by L4 and L5. L5 is used to prevent RF feedback when connected to an oscilloscope for tuning.

The detected output couples to the decoder via D2. The decoder may advantageously be a NE5045, which is a special serial input, parallel output, decoder intended for application to R/C systems. The serial input is amplified and shaped before being fed to the counter/decoder. An integrating type synchronization separator detects pulses greater than the time constant for C20×R9 in the schematic diagram (FIG. 15) to reset the counter. The NE5045 contains an internal voltage regulator that, in combination with filter capacitors C15, and C16, and C17, provides excellent isolation of the decoder logic from the power supply: i.e., greater than 40 db of power supply rejection.

The detected output from any receiver, as the signal level decreases at long range, contains thermal noise at low levels, varies in level with RF signal strength, and may contain flutter. The latter is usually present when strong adjacent channel signals are present, which happens when the animal is near another operator's transmitter.

The thermal noise can be filtered with a simple R/C circuit. This filter has a cut off frequency of about 3 KHz, which is close to the bandwidth of the receiver IF amplifier. The schematic shows the external connections for the decoder input in which the above mentioned conditions are handled. Diodes D2 and D3 charge the 1 uf coupling capacitor to the peak input voltage minus the fixed voltage at pin 12 and the diode drops. Thus, noise spikes are clipped well below the threshold of the decoder amplifier. D3 also clamps the input signal reaching the operational amplifier that is the internal input to the decoder. C14 acts as a filter which allows the amplitude of the input to vary over a wide range and at high rates (as a result of the RF flutter mentioned earlier) without false triggering of the decoder. C14 charges up to the average baseline voltage but R7 does not allow it to be charged by the information pulses. Thus, so long as the pulse peaks exceed the baseline voltage by greater than the drop across diode D2, the system will be unaffected by baseline flutter, no matter what its rate is.

Positive feedback has also been incorporated in the decoder to provide 100 millivolts of hysteresis on the threshold. When the input at pin 13 is low, the current generator (internal to the IC and with its output available at Pin 11) is off and pin 11 is near ground. The threshold is determined by the ratio of R15 to R12+R11. When pin 13 goes positive, the current generator turns on and approximately 150 microamperes is sourced. This raises pin 11 by 150 uA×R11=0.7 V and the threshold is now V12-V13 or 0.3 V. The amplifier will not turn off until the input drops below 0.3 V, adding greater to the noise rejection capability of the decoder.

R16 and C18 form a 2.8 KHz low pass filter to further improve noise rejection. C21 and R10 set the minimum pulse width that the decoder will accept. Thus, this all IC decoder does three important things, as well as decoding the outputs:

Clips all inputs that are less than 400 mv.
Rejects flutter in the baseline and
Filters noise spikes.

Figure 16:
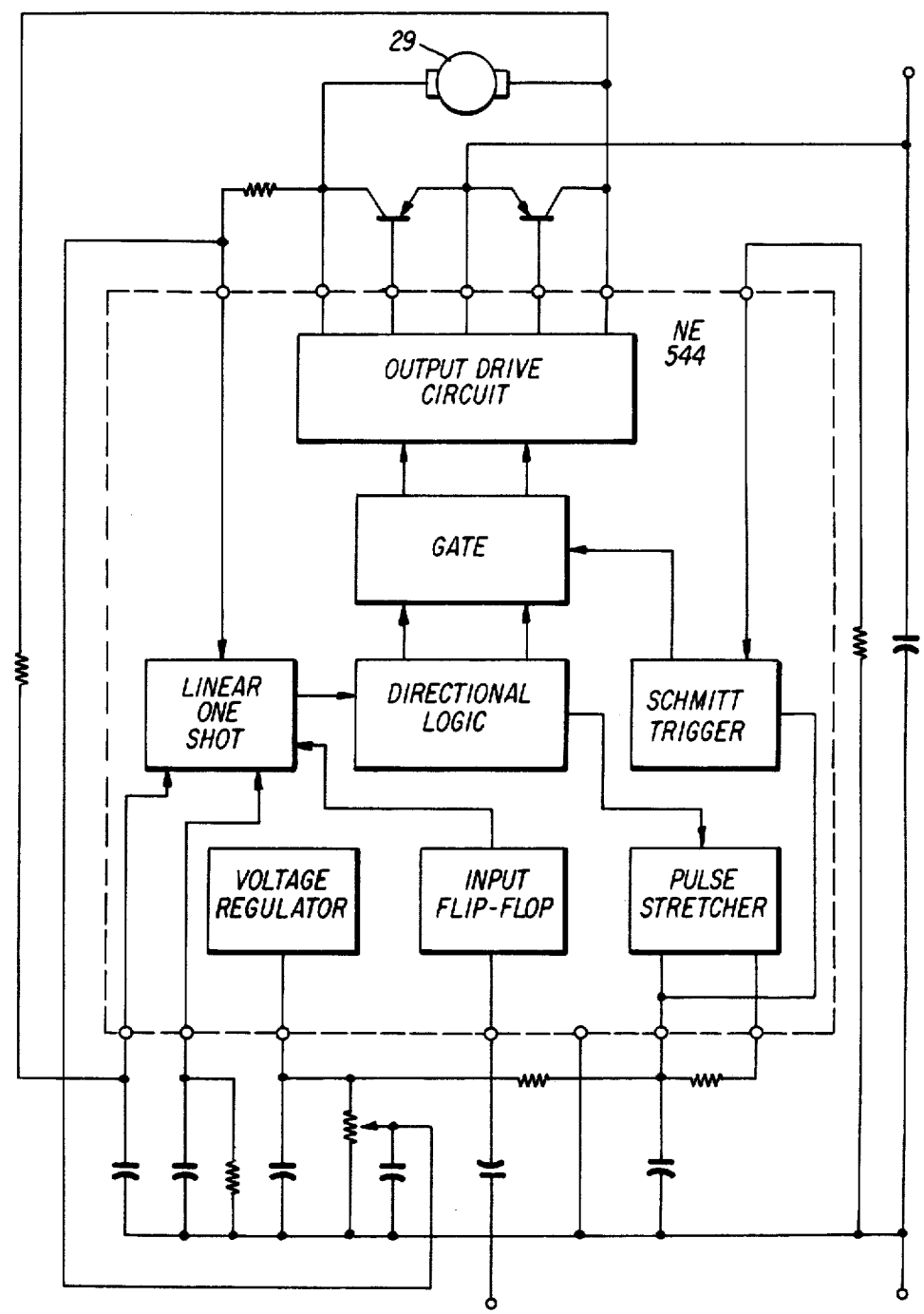
FIG. 16 is a schematic of one of the side servoamplifiers according to the first embodiment, showing the location of a side servomotor.

The output from the decoder 106 drives the various servoamplifiers 107-111. FIG. 16 illustrates one of the servoamplifiers 109-111 that are used to drive each of the side servomotors 29 and the crop servomotor 31.

A positive input signal applied to the input pin (4) sets the input flip flop and starts the one shot time period. The directional logic compares the length of the input pulse to that of the internal one shot and stores the result of this comparison in a directional flip flop. The exact difference in pulse width between input and internal one shot pulse, called the error pulse, is also fed to a pulse stretcher, deadband and trigger circuits. These circuits determine three important parameters:

(1) DEADBAND—The minimum difference between input pulse and internally generated pulse to turn on the output.

(2) MINIMUM OUTPUT PULSE—The smallest output pulse that can be generated from the trigger circuit.

(3) PULSE STRETCHER GAIN—The relationship between error pulse and output pulse.

Adjustment of these parameters is achieved with external resistors and capacitors at pins 6, 7 and 8. Deadband is controlled by resistor $R_{DB}$. Minimum Output Pulse is controlled by $R_{MP}$. The Pulse Stretcher Gain is adjusted by capacitor $C_S$ and resistor $R_S$. The trigger circuit activates the gate for a precise length of time to provide drive to the bridge output circuitry in proportion to the length of the error pulse.

Resistor $R_F$ determines the amount of feedback required for good closed loop damping.

Q1 and Q2 are external PNP transistors for increased motor drive, which make a faster, more powerful servo with better resolution. The amount of servo travel is controlled by resistor $R_T$ and can be varied to change the amount of servo rotation.

Figure 17:
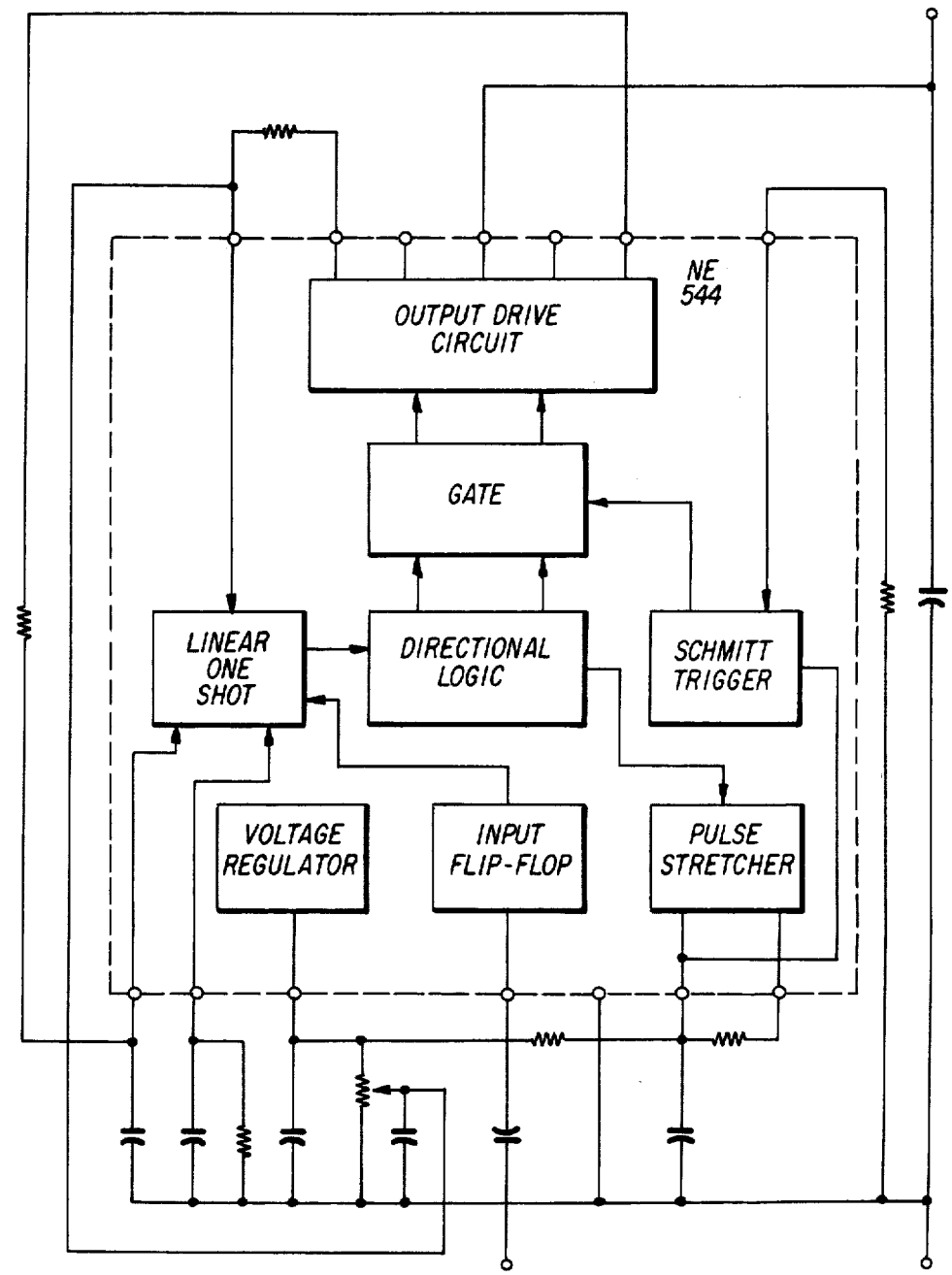
FIG. 17 is a schematic of one of the rein servoamplifiers.
Figure 18:
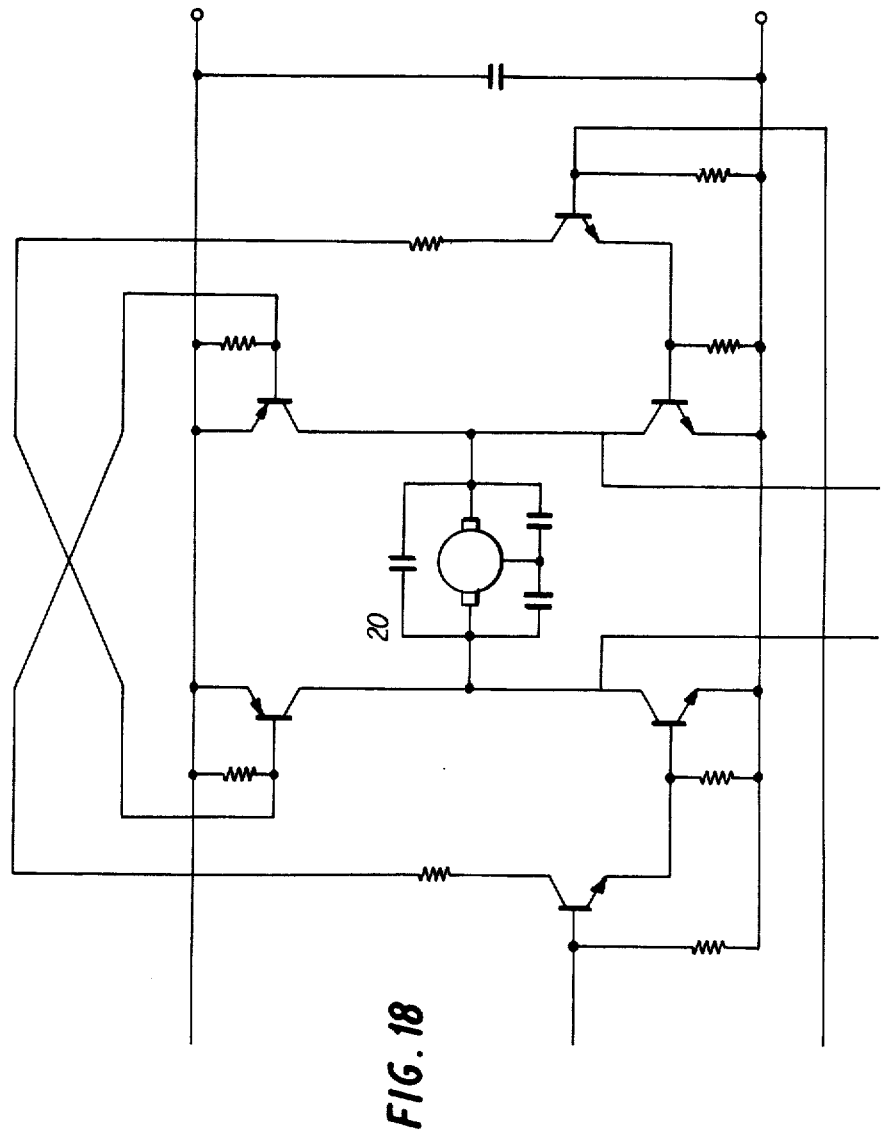
FIG. 18 is a schematic of one of the bridge amplifiers used with the servoamplifier of FIG. 17 to drive one of the rein servomotors of the first embodiment.

An example of one of the rein servoamplifiers 107 and 108 for driving rein servomotors 20 is illustrated in FIGS. 17 and 18. The servoamplifier of FIG. 17 is substantially the same as the one represented by FIG. 16, except for the addition of a bridge circuit illustrated in FIG. 18 so that the rein servomotor 20 can run on 12 V.

Figure 19:
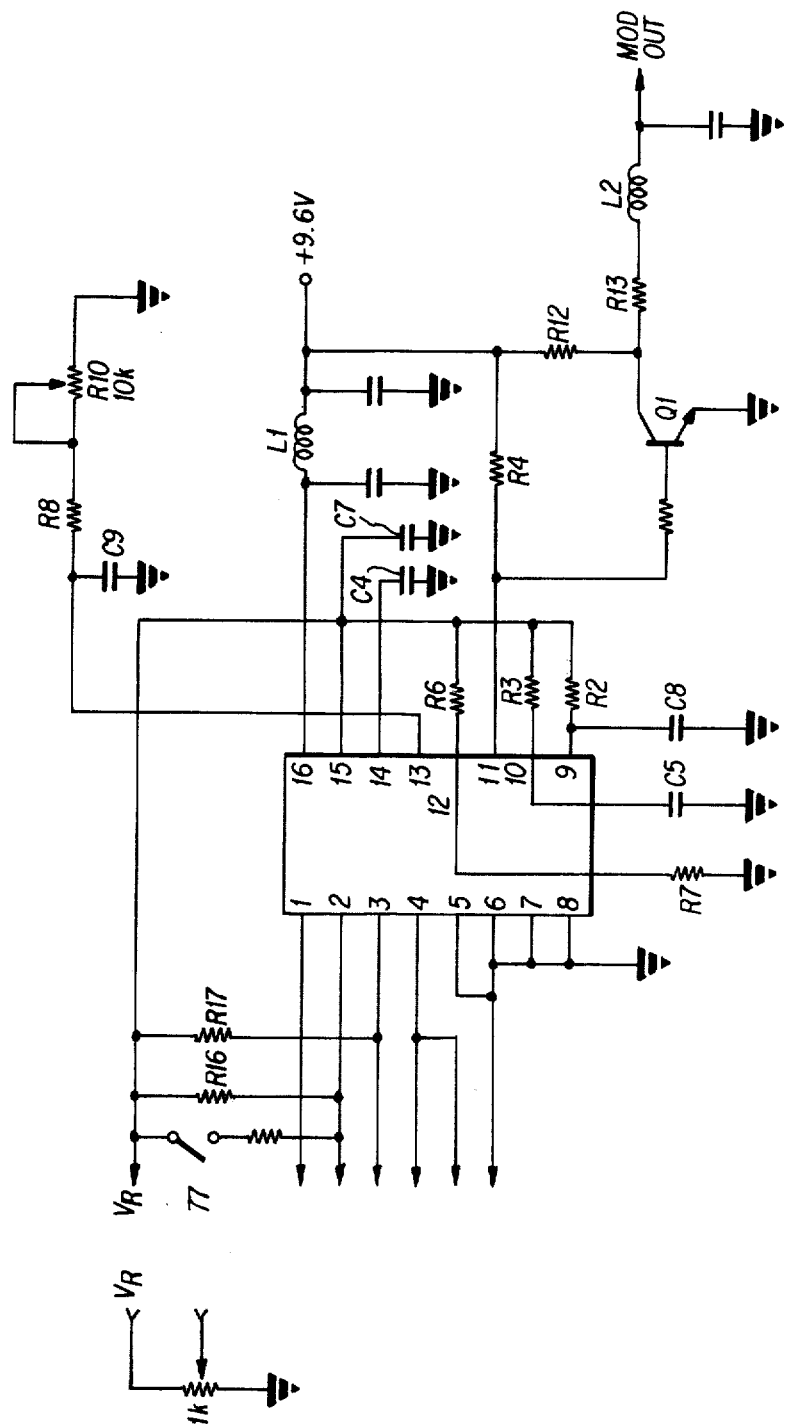
FIG. 19 is a schematic of the failsafe transmitter encoder.

Failsafe transmitter 118 includes the failsafe encoder illustrated schematically in FIG. 19 and a failsafe transmitter RF section, which may advantageously embody a circuit as described and shown above with respect to FIG. 13. Similarly, the failsafe receiver 119 may advantageously employ a receiver/decoder as described and shown above with respect to FIGS. 14 and 15. Thus, the failsafe system uses basic circuitry like that of the command system, except that only one channel is used instead of five channels. The failsafe transmitter encoder illustrated in FIG. 19 is similar in function to the command transmitter encoder shown in FIG. 9, except that a 10K potentiometer is used to condition the input channel to vary the pulse width emitted on channel 1 from 1 millisecond to 2 milliseconds when switch 77 is operated.

Figure 20:
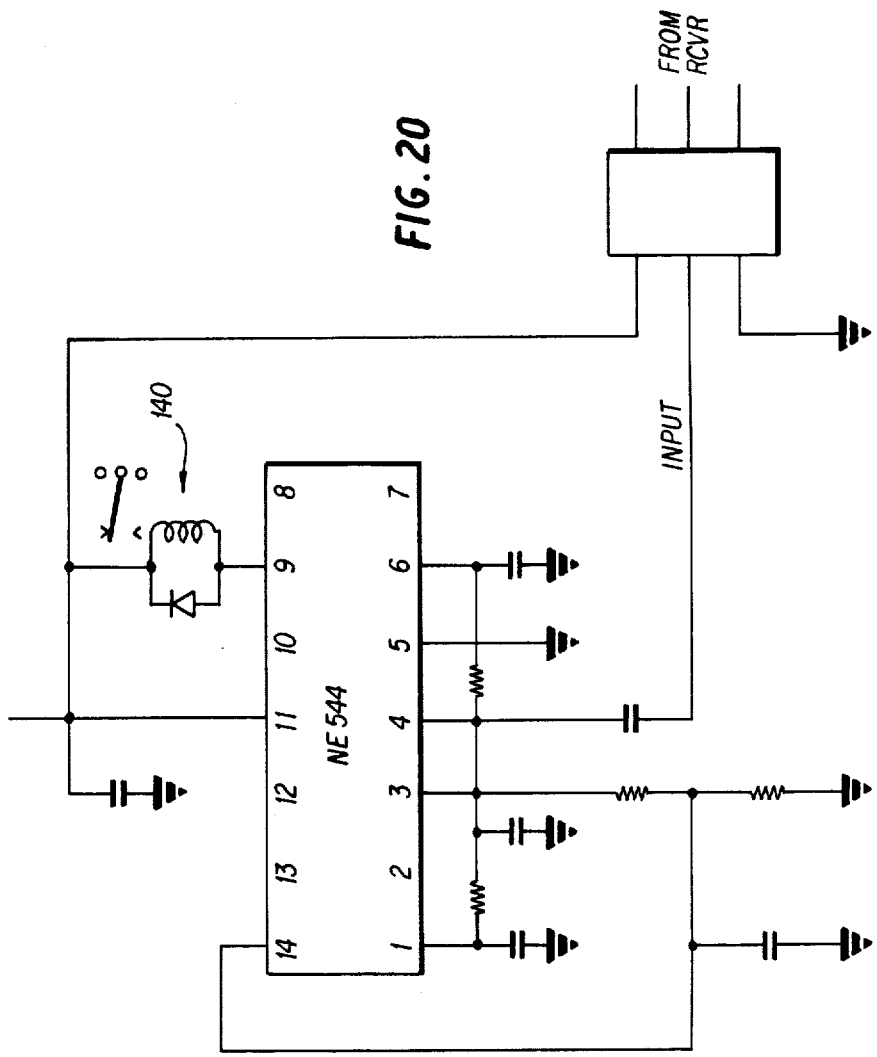
FIG. 20 is a schematic of the failsafe servoamplifier.

Failsafe servoamplifier 120 is illustrated in FIG. 20. It is similar to the servoamplifiers 1-9 and 110, except that the servomotor is replaced by actuating means in the form of a relay 140 for initiating the retraction of the head-pulling member 42.

Figure 21:
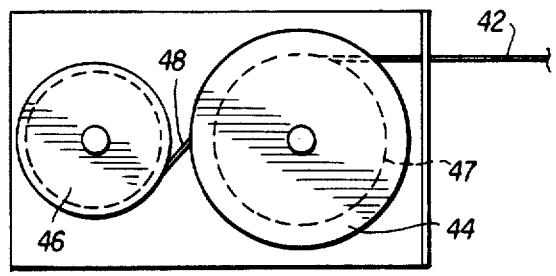
FIG. 21 shows a side view according to a first embodiment of the retracting means of the failsafe mechanism.
Figure 22:
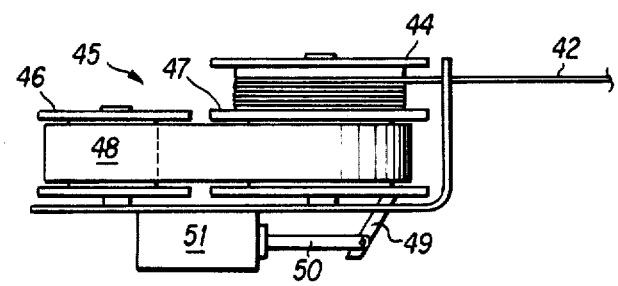
FIG. 22 shows a top view of the embodiment of FIG. 21.

FIGS. 21 and 22 illustrate a first embodiment of the retracting means 43 (FIG. 1) of the failsafe mechanism. It includes a winch having a drum 44 that is used to retract head-pulling member 42. The winch is turned by flat spring motor 45 comprising first and second spools 46, 47 and flat spring 48 wound therearound. Second spool 47 also comprises at least one pawl 49 engagable by retractable arm 50 of solenoid 51. At actuation of the failsafe mechanism, the solenoid 51 is energized to retract arm 50, thereby releasing pawl 49 such that second spool 47 is free to turn. Flat spring 48 then will rotate second spool 47, thereby causing the retraction of head-pulling member 42 until such time as the tension in flat spring 48 is released. Thereafter, the stiffness of spring 48 will retain the head of the animal in its retracted position until help is available. When it is desired to re-use the mechanism, the mechanism may be re-set by manually pulling on head-pulling member 42 so as to re-tension flat spring 48. In the alternative, drum 44 may be turned by any expedient mechanical means. Pawl 49 and solenoid arm 50 may be designed so as to provide a ratcheting action during this re-setting operation.

Figure 23:
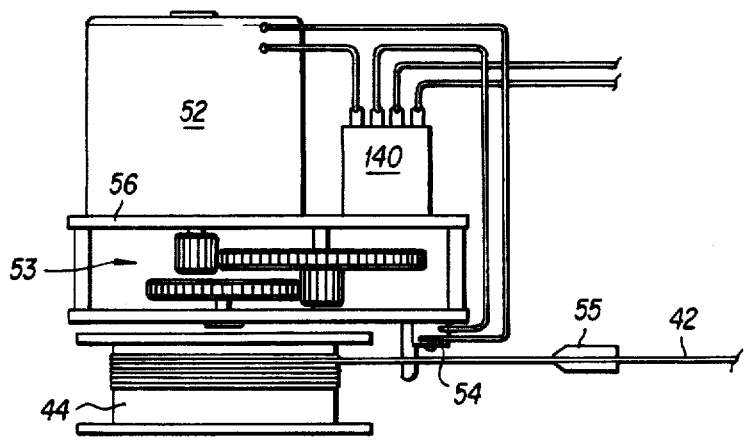
FIG. 23 shows a top view according to a second embodiment of the retracting means of the failsafe mechanism.

FIG. 23 illustrates a second embodiment of the retracting means 43 of the failsafe mechanism. As before, head-pulling member 42 is retracted by a winch which includes a drum 44. In this embodiment, the winch includes a motor 52 which is turned on by relay 140 upon actuation by the operator of the failsafe mechanism. Motor 52 drives drum 44 through gear train 53. The retracting means of this embodiment also includes a limit switch 54 mounted on frame 56 and limit switch contact means 55 fixedly attached on headpulling member 42. Limit switch contact means 55 serves to open limit switch 54, thereby interrupting the supply of electric power to motor 52 to stop the operation of the retracting means.

In a typical application, the limit switch contact means 55 will be disposed on the head-pulling member 42 at a point thereof approximately 12 inches away from limit switch 54 when the apparatus is configured ready for use.

Once the head-pulling member 42 has been retracted, the natural resistance to turning offered by the gear train 53 and motor 52 will retain the head of the animal in its retracted position.

The apparatus may be reset by simply looping head-pulling member 42 off of the drum 44.

For both embodiments of the retracting means, the goal is to pull the head of the animal at a rate that is sufficiently slow to avoid the possibility of imparting a damaging jerk to the head of the animal. It has been found that, with a constant pull, the animal eventually will "give" to the pull without fighting it. Furthermore, it is preferable that head turning member 42 be retracted at a substantially constant rate.

For the case of a horse, an appropriate but not critical retraction of head turning member 42 is a distance of about twelve inches and a time span of ten seconds.

In order to avoid damage to the animal, the retracting means should have a maximum force-generating capacity. For the case of a horse, it has now been found that a force in excess of 3 pounds is required. A force of approximately 5 pounds is thought to be sufficient for retracting the head-turning member and maintaining the retracted state without injury to the animal.

In the embodiment of FIGS. 21 and 22, it is preferable to use a constant torque spring motor so that the desired retracting characteristics may be achieved. Such a constant force spring motor is available, for example, from AMETER, Hunter Spring Division, Hatfield, PA, under the trademark "Neg'ator." It comprises a prestressed strip of spring material 48 which is formed into a coil and stored on a small storage drum (such as first spool 46). The free end of the spring is backward-wound onto a larger output drum (such as second spool 47) and fastened thereto. When the output drum 44 is released upon actuation of the failsafe mechanism by the operator, the spring will return to its storage drum to assume its natural curvature and, in the process, rotate the output drum with virtually constant torque over a predetermined amount of rotation.

If a different spring-loaded motion arrangement were to be used, there may be a need for other means to regulate the rotation speed of drum 44 in order to impart a steady, constant pulling force to member 42. A nylon drag brake contacting second spool 47 could be used for this purpose.

In the embodiment of FIG. 23, the above-recited retracting characteristics may easily be achieved by appropriate selection of the gear train 53, electronic adjustment of the speed of the servomotor 52, and proper location of limit switch contact means 55 on member 42.

Figure 24:
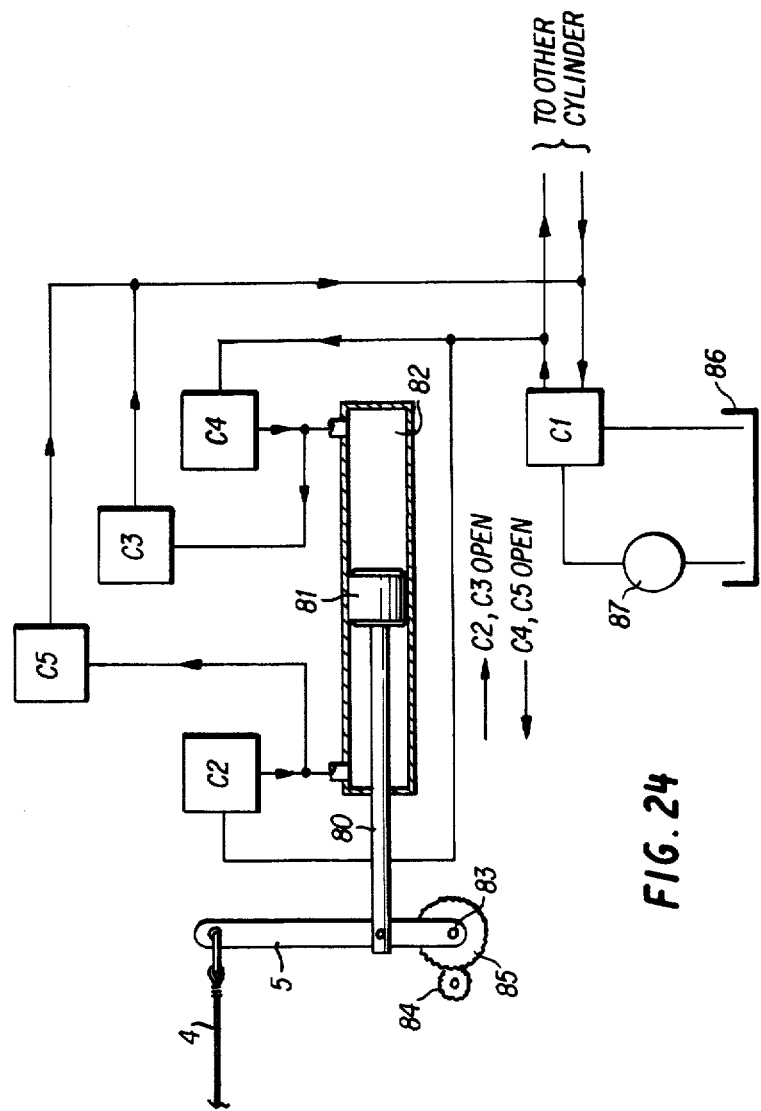
FIG. 24 is a diagram illustrating, for one rein arm, the physical components according to the hydraulically-actuated embodiment that differ from those of the first embodiment, with the associated rein being shown in phantom.

FIG. 24 is a diagram illustrating an embodiment of the invention in which the rein arms 5 are driven by hydraulic actuation rather than by servomotors. The figure shows hydraulic fluid reservoir 86, pump 87 and dump valve C1, which are common to both rein arms 5. The remainder of FIG. 24 illustrates one of two identical systems which govern the operation of each rein arm.

Figure 25:
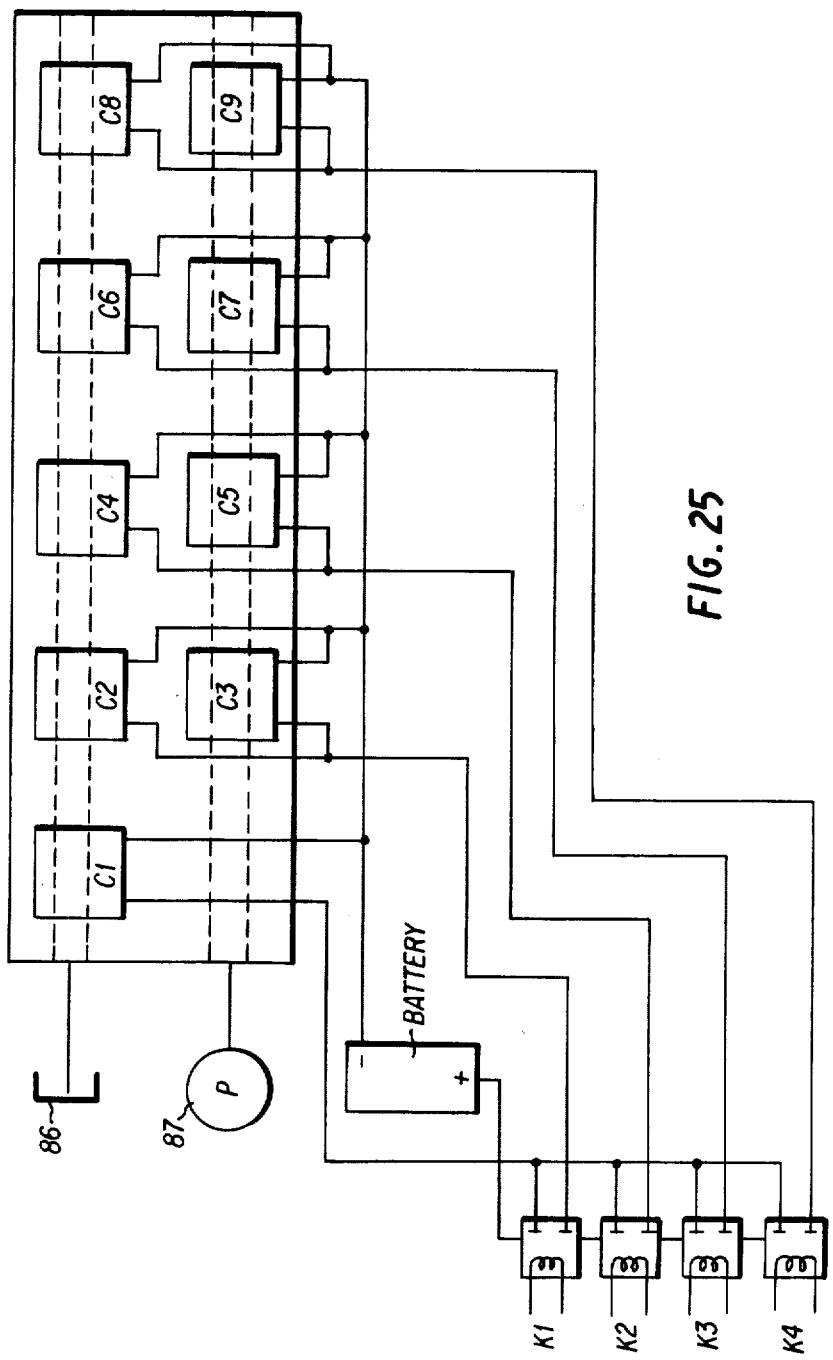
FIG. 25 illustrates the wiring of the electrical components of a second embodiment according to the invention in which the rein control arms are hydraulically-actuated.

In this embodiment, each rein arm 5 is mounted for rotation about an axis 83 at its lower end. The motion of rein arm 5 is governed by piston arm 80, attached to piston 81, which is hydraulically driven for reciprocation in cylinder 82. This reciprocation occurs under the control of valves C2–C5 using fluid pressure supplied by pump 87. The corresponding action of the non-illustrated rein arm and piston will be governed by valves C6–C9 (FIG. 25).

The motion of rein arm 5 causes gear 85 to turn, which in turn drives gear 84. Gear 84 is fixed on the shaft of a 5 K ohm potentiometer of a feedback loop, which is maintained to preserve the proportional movement of the arms.

Substantial portions of the electronics of the first embodiment are also used in this embodiment. FIG. 25 illustrates the electronics of the hydraulic embodiment, to the extent that they are different.

C1 is a pump dump valve which is open when any of the four relays (K1-K4) are closed to supply hydraulic pressure to the system. When the relays all are open, valve C1 is closed, which routes the fluid back to the tank.

When relay K1 is closed, valves C2 and C3 are opened, which allows fluid to enter the front of cylinder 82 and exit the rear of the cylinder, so that piston 81 moves back in the cylinder, pulling the rein arm 5 rearwardly.

When relay K2 is closed, valves C4 and C5 are open, thereby allowing fluid to enter the rear of the cylinder 82 and exit the front, so that the piston 81 moves forward in the cylinder, pushing forward the rein arm 5. Relays K3 and K4 and valves C6–C9 perform the same function for the cylinder of the other rein arm.

Through the operation of the gears 84 and 85, the movement of the arm rotates the feedback potentiometer, whose electric resistance tells the servoamplifier (FIG. 17) whether or not to close the appropriate relay to bring the rein arm 5 to the desired position.

This hydraulic embodiment is capable of generating substantially larger forces to move the rein arms 5. Accordingly, it is of special use in controlling larger animals.

It is contemplated that a single set of rein arms may control more than one animal simultaneously. For example, reins from at least three teams of two horses each, all pulling together, could be attached to a single pair of rein arms.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Apparatus for remote control of a reined animal by an operator, comprising:

mounting means mounted on the animal;

two rein arms mounted on said mounting means for pivotal motion and being disposed such that outer ends of said rein arms are movable along respective separate arcuate paths, each said arcuate path being disposed substantially above the level of the back of the animal and extending upwardly and rearwardly of the animal, said outer ends of said rein arms being adapted for attachment thereto of the reins;

rein arm driving means mounted on said mounting means and drivingly engaging said rein arms;

housing means remote from the animal;

operator-controllable electronic rein arm imput means disposed in said remote housing means and having a neutral position; and coupling means operatively coupling said rein arm input means and said rein arm driving means such that said rein arm driving means is responsive to said rein arm input means, wherein said rein arm input means, said coupling means and said rein arm driving means collectively comprise means for moving said outer ends of said rein arms in either of first and second directions along said arcuate paths and for distances along said arcuate paths that are proportional to a corresponding movement of said rein arm input means from and toward said neutral position thereof.

2. The apparatus of claim 1, wherein:

said rein arm input means further comprises a joy stick having an operational range bounded by an imaginary closed geometric figure centered on a neutral position of said joy stick, said joy stick being manually movable to any instantaneous position within said operational range;

said rein arm driving means further comprises two rein servomotors respectively drivingly engaging said rein arms; and said coupling means further comprises means for electronically encoding a rein arm signal uniquely indicative of said instantaneous position of said joy stick and means responsive to said rein arm signal for driving said rein servomotors to position said outer ends of said rein arm to a configuration uniquely representative of said instantaneous position of said joy stick.

3. The apparatus of claim 1, further comprising electronic means for establishing video communication from said animal to said operator.

4. The apparatus of claim 1, further comprising a crop, a crop servomotor drivingly mounting said crop and being attached to said mounting means, said crop servomotor comprising means for causing said crop to move toward and contact said animal, and operator-controllable crop input means in said housing means for selectively causing operation of said crop servomotor.

5. The apparatus of claim 1, wherein said rein arm input means, said coupling means and said rein arm driving means collectively comprise means for moving said outer ends of said rein arm at a rate of motion that is proportional to a rate of motion of said rein arm input means.

6. The apparatus of claim 1, further comprising:

side contact means comprising side contact members respectively disposed adjacent opposite sides of said animal, being mounted on said mounting means, disposed in locations corresponding to the lower limbs of a rider, and being movable toward and away from said animal to selectively contact the sides of said animal; and side contact control means comprising operator-controllable electronic side contact input means housed in said housing means and side contact driving means responsive to said side contact input means for moving said side contact members.

7. The apparatus of claim 6, wherein:

said side contact driving means comprises two side servomotors respectively disposed on opposite sides of said animal; and said side contact means further comprises two side contact arms, each side contact arm having first and second ends and being drivingly engaged with a respective one of said side servomotors at a location of said side contact arm intermediate said first and second ends, there being one of said side contact members disposed at said first end of each side contact arm and one of said said contact members disposed at said second end of each side contact arm.

8. The apparatus of claim 1, further comprising emergency animal control means comprising:

resettable emergency animal manipulating means for physically manipulating said animal into a posture in which said animal is inhibited from straying from its location, said resettable emergency animal manipulating means being operable on a one-time basis without being reset; and operator-controllable electronic emergency input means housed in said housing means for actuating said resettable emergency animal manipulating means.

9. The apparatus of claim 8, wherein said emergency animal control means further comprises an electric power supply dedicated to the operation thereof.

10. The apparatus of claim 8, wherein:

said emergency animal manipulating means further comprises a head-pulling member, other than said reins, attached at an end thereof to the head of said animal and electrically-actuated retracting means disposed on said mounting means for pulling the head of the animal toward the body of the animal and maintaining it there by retracting said head-pulling member to a retracted state and maintaining said retracted state, said retracting means being responsive to an electronic emergency signal; and said operator-controllable emergency input means further comprises means for generating said electronic emergency signal.

11. The apparatus of claim 1, further comprising electronic means for establishing audio communication from said animal to said operator.

12. The apparatus of claim 11, further comprising electronic means for establishing audio communication from said operator to said animal.

13. The apparatus of claim 12, further comprising electronic means for establishing video communication from said animal to said operator.

* * * * *

UNITED STATES PATENT AND TRADEMARK OFFICE
CERTIFICATE OF CORRECTION

PATENT NO. : 4,651,678
DATED : March 24, 1987
INVENTOR(S) : David R. Kime

It is certified that error appears in the above-identified patent and that said Letters Patent is hereby corrected as shown below:

Column 1, line 41, correct the spelling of "surveillance"; Column 12, line 9, change "bidirectional" to --bi-directional--; Column 12, line 12, change "safe" to --same--; Column 13, line 37, correct the spelling of "undesirable"; Column 16, line 12, change "headpulling" to --head-pulling--; and Column 19, line 25, change "said said" to --said side--.

Signed and Sealed this

Fourteenth Day of June, 1988

Attest:

DONALD J. QUIGG

*Attesting Officer*         *Commissioner of Patents and Trademarks*